(12) United States Patent  
Ghinamo et al.

(10) Patent No.: US 8,179,311 B2  
(45) Date of Patent: May 15, 2012

(54) METHOD FOR THE ACQUISITION OF SIGNALS OF A GLOBAL NAVIGATION SATELLITE SYSTEM

(75) Inventors: Giorgio Ghinamo, Turin (IT); Riccardo Lesca, Turin (IT); Gianluca Boiero, Turin (IT)

(73) Assignee: Telecom Italia S.p.A., Milan (IT)

( * ) Notice: Subject to any disclaimer, the term of this patent is extended or adjusted under 35 U.S.C. 154(b) by 190 days.

(21) Appl. No.: 12/733,229

(22) PCT Filed: Aug. 21, 2007

(86) PCT No.: PCT/EP2007/058657  
§ 371 (c)(1),  
(2), (4) Date: Feb. 18, 2010

(87) PCT Pub. No.: WO2009/024184  
PCT Pub. Date: Feb. 26, 2009

(65) Prior Publication Data  
US 2010/0141520 A1 Jun. 10, 2010

(51) Int. Cl.  
*G01S 19/24* (2010.01)

(52) U.S. Cl. ................................. 342/357.63

(58) Field of Classification Search ............ 342/357.21, 342/357.4, 357.63, 357.71; 701/213, 215  
See application file for complete search history.

(56) References Cited

U.S. PATENT DOCUMENTS

| 6,236,354 B1 * | 5/2001 | Krasner .................... 342/357.59 |
| 6,512,479 B1 | 1/2003 | Sahai et al. |
| 6,933,886 B1 | 8/2005 | Sahai et al. |
| 2003/0227963 A1 | 12/2003 | Dafesh |
| 2004/0012521 A1 | 1/2004 | Akopian et al. |
| 2006/0222113 A1 | 10/2006 | Harrison |
| 2011/0103433 A1 * | 5/2011 | Krasner ........................ 375/150 |

FOREIGN PATENT DOCUMENTS

WO WO 03/084086 A1 10/2003

OTHER PUBLICATIONS

European Search Report for International Application No. PCT/EP2007/058657, mailing date Jun. 3, 2008.  
P.A. Dafesh et al.; "A Novel Approach to Enhancing the Sensitivity of C/A code GPS Receivers", Proc. of the 57th Ann. Meeting of the Institute of Navigation, XP-002480878, pp. 481-488, (2001).

* cited by examiner

*Primary Examiner* — Dao Phan  
(74) *Attorney, Agent, or Firm* — Finnegan, Henderson, Farabow, Garrett & Dunner, L.L.P.

(57) ABSTRACT

A method of acquisition of a received signal received from a global navigation satellite system, includes: obtaining a snapshot of the received signal; correlating the snapshot with a locally-generated signal, wherein the correlating includes: trying a phase delay value indicative of a hypothesized phase delay of the locally-generated signal with respect to the snapshot; and obtaining a partition of the snapshot and the locally-generated signal into corresponding pluralities of blocks, and calculating partial correlation integrals for each block of the plurality of blocks. The corresponding pluralities of blocks each include a first block having a time duration related to the phase delay value.

24 Claims, 11 Drawing Sheets

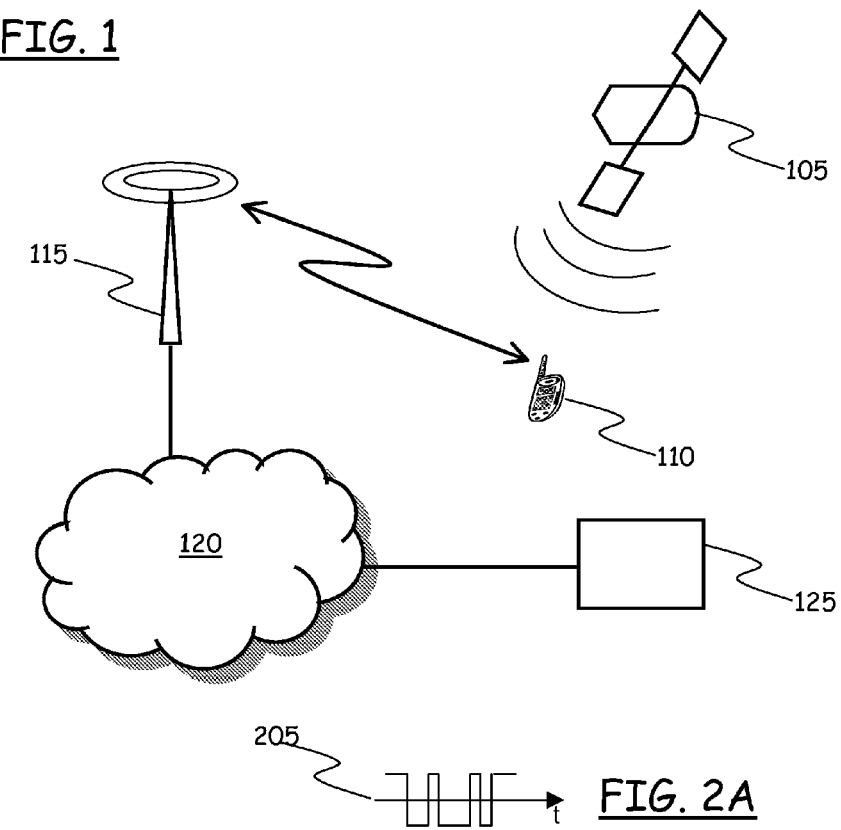
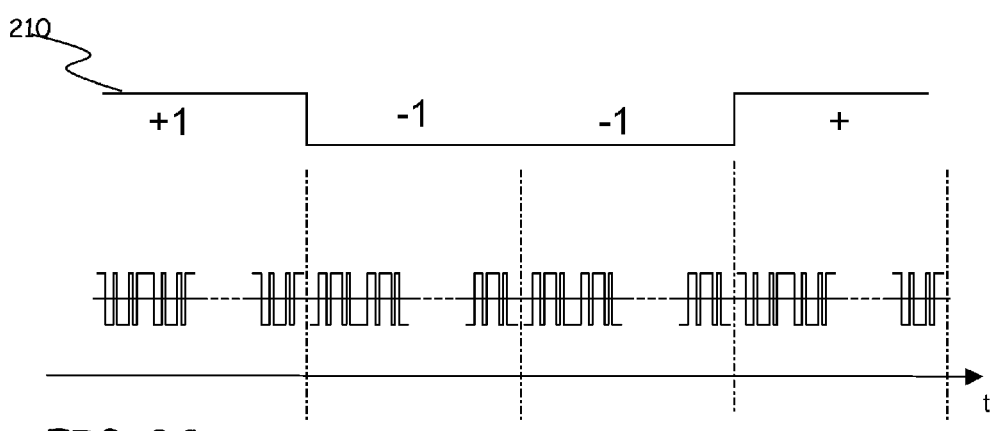

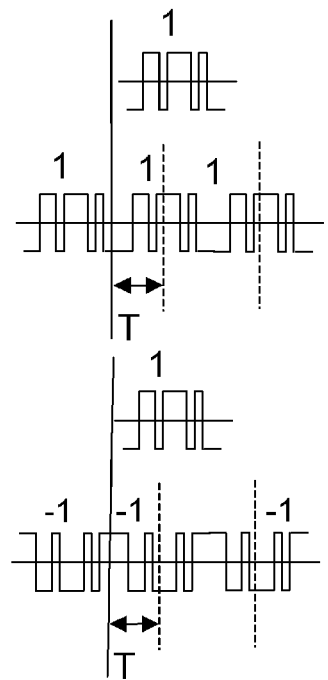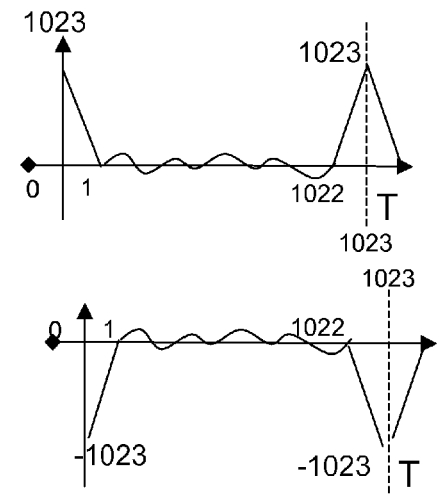
FIG. 6A
FIG. 6B
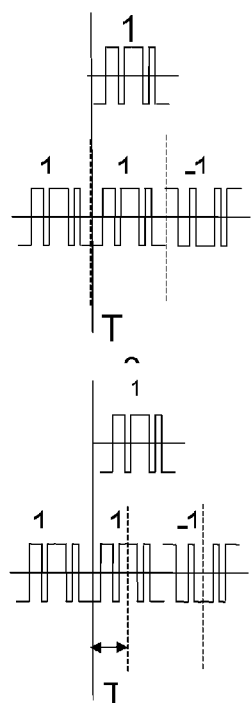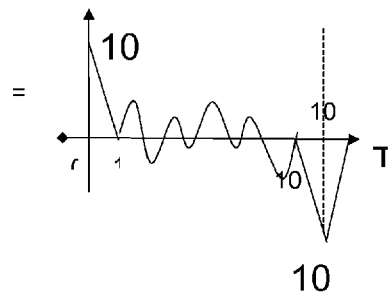
FIG. 6C

FIG. 9
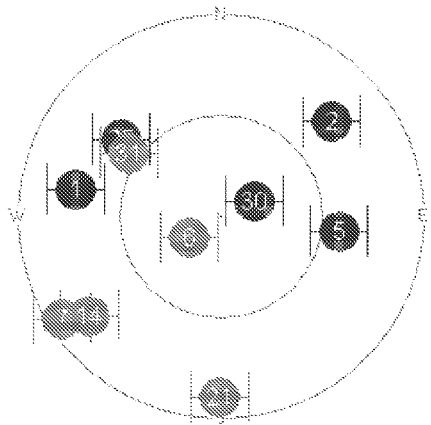
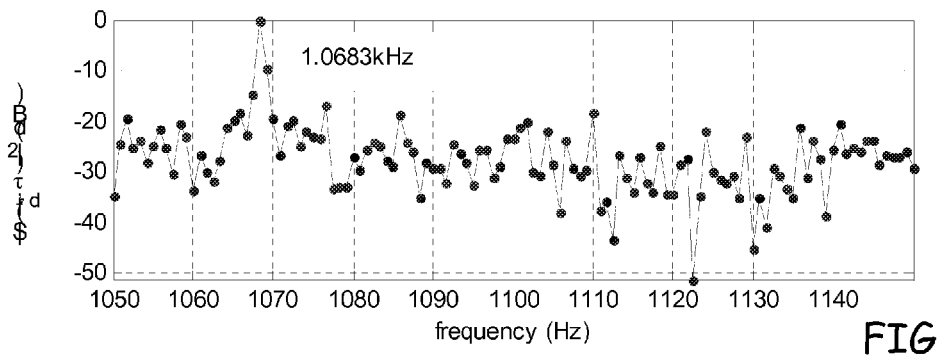
FIG. 12
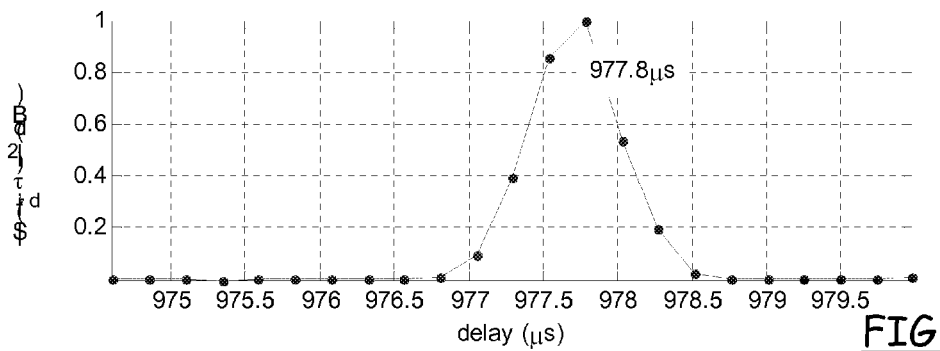
FIG. 13

US 8,179,311 B2

METHOD FOR THE ACQUISITION OF SIGNALS OF A GLOBAL NAVIGATION SATELLITE SYSTEM

CROSS REFERENCE TO RELATED APPLICATION

This application is a national phase application based on PCT/EP2007/058657, filed Aug. 21, 2007, the content of which is incorporated herein by reference.

BACKGROUND OF THE INVENTION

1. Field of the Invention

The present invention generally relates to systems adapted to enable determining the position of objects in space, for example, but not limitatively, the objects' location on the Earth's surface, particularly to Global Navigation Satellite Systems (GNSSs) like the Global Positioning System (GPS). More specifically, the invention concerns a method for the acquisition of signals used for determining an object's location.

2. Description of the Related Art

GNSSs, and, particularly, the GPS are systems based on signal transmitters transported by a constellation of satellite vehicles orbiting around the Earth, and designed to enable the determination of the position of objects on the Earth surface.

Consumer electronic devices exploiting the GPS for purposes of location determination and aid to navigation are nowadays very common.

In general terms, in the GPS system a receiver (e.g., part of a navigation tool, a mobile phone, a Personal Digital Assistant-PDA-, a palmtop computer) acquires signals transmitted by transmitters on four or more satellite vehicles, to derive a three-dimensional location of the object and a current time stamp.

The GPS receiver normally receives the signals transmitted by multiple satellite transmitters, and performs an operation referred to as "signal acquisition", which in general terms is a coarse synchronization process by which the receiver estimates from which transmitters, i.e. by which satellite vehicles the received signals have been transmitted. The information obtained by performing the signal acquisition operation is then exploited in a following signal tracking process, that enables the receiver to track the acquired signal sources.

Each GPS transmitter on a satellite vehicle emits a radio carrier signal at microwave frequency, referred to as the "L1" frequency.

The carrier signal at the L1 frequency (1575.42 GHz), which is exploited by commercial positioning and navigation equipment, is modulated by a Coarse Acquisition (C/A) code, a Precise (P) acquisition code, and by data that make up a "navigation message".

The C/A code is a Pseudo Random Noise (PRN) code comprised of 1023 bits (also referred to as "chips") that is repeated every millisecond (i.e., at a nominal repetition frequency of 1 KHz). All the satellite transmitters transmit over the same radio carrier at the L1 frequency, according to a CDMA (Code Division Multiple Access) multiplexing scheme which uses the C/A codes as spreading codes (Gold codes). Each satellite transmitter is assigned a unique C/A code, different from the C/A codes assigned to the other transmitters. The C/A codes assigned to the transmitters on the constellation of satellite vehicles are freely available to the public.

The P code is repeated at a higher frequency, and thus allows a more precise determination of the receiver's location; however, the P code is encrypted, and not available to the public.

The data making up the navigation message form a 50 Hz digital signal, used to modulate the phase (phase modulation) of the radio carrier, and consisting of data bits that encode a time stamp (the so-called "GPSToW", or "GPS Time of the Week", the GPS satellite vehicle's orbit parameters (including the so-called "almanac" and "ephemeris"), clock corrections, and other parameters; all these data are useful for the receiver to calculate and update its location on the Earth surface.

One approach to the signal acquisition process calls for the receiver to generate a local signal, modulated by a local replica of the PRN code that is broadcast by the transmitter on the satellite vehicle(s) potentially visible overhead the receiver, and determining a correlation between the received signal and the locally-generated signal. The correlation is typically performed by calculating both the "In phase" (I) and the "Quadrature" (Q) correlation integrals.

The results of the correlation integrals are strongly affected by the data bits of the navigation message that modulate the phase of the transmitted radio carrier signal; these data bits are unknown at a standard standalone receiver. As a consequence, the results of the I and Q correlation integrals are not reliable when the integration time is extended beyond the duration (20 ms) of one data bit of the navigation message, due to the possible (unknown) phase inversions experienced by the received signal.

A problem arises when the received signal is degraded, like for example when the receiver is inside a building (indoor environment): in these cases, to compensate for the signal degradation, the integration time, i.e., the duration of the received signal to be considered for performing the signal acquisition (and for the signal tracking after the signal has been acquired), should be extended to some seconds, i.e. well beyond the duration of one data bit; the correlation between the received signal and the locally-generated signal is thus calculated over a time interval that spans multiple navigation message data bits, and it is not possible to neglect the phase transitions (changes in sign) of the radio carrier signal.

In U.S. Pat. No. 6,933,886 a signal acquisition technique using data bit information is disclosed, wherein coherent correlation (the calculation of I and Q correlation integrals for sampled data that is associated with the received signal) may be performed by breaking the signal into small blocks of 1 ms length, and performing calculations on a block-by-block basis. In particular, using data bit information, i.e. information about the data message being transmitted by the signal source, the I and Q correlation integrals are calculated for each small block of data. Due to the fact that the time may be known only approximately, the blocks may not be able to be classified with certainty as to which one corresponds to which position within the 20 milliseconds time span before potential sign changes or flips. Thus, for those blocks of data for which a flip may occur, the I and Q correlation integrals are calculated both with and without a change in sign. In other words, for those blocks of data near the 20 milliseconds marks, the I and Q correlation integrals are calculated both with and without a change in sign.

SUMMARY OF THE INVENTION

The Applicant has observed that it would be desirable to keep the computation complexity inherent to the signal acquisition operation low, even in case the signal acquisition is to be performed in indoor environments. This is particularly important whenever the GNSS receiver is part of a portable device, which normally has a limited processing power, and, being battery-powered, limited power consumption capabilities.

The Applicant has also observed that the technique proposed in U.S. Pat. No. 6,933,886 is rather complex, from the computational viewpoint. Indeed, repeating the calculation of the I and Q correlation integrals for those 1 ms blocks near the 20 ms marks assuming both a sign change and no sign changes increases the computational burden of the receiver. In a scenario where the GNSS receiver is not synchronous with the "GPSTime" (the time scale of the GPS satellite transmitters, implemented by atomic clocks at the GPS ground control center), the repeated calculation of the I and Q correlation integrals for both a sign change and no sign changes needs to be performed for every block of the block partition.

The Applicant has found a way by which, thanks to a peculiar partition into blocks of the received and locally-generated signals, it is possible to reliably acquire signals transmitted by transmitters of a positioning system even when the received signal(s) are feeble, like in indoor environments, by performing correlations with a locally-generated signal over relatively long time intervals, spanning multiple navigation message data bits, while keeping the computation complexity relatively low.

In particular, the Applicant has found that by partitioning a snapshot of a received signal and of a signal generated locally at the receiver into a plurality of blocks wherein the first block has a duration corresponding to an hypothesized phase delay value between the snapshot and the locally-generated signal allows keeping the calculations to be performed for determining a correlation between the two signals relatively simple.

According to an aspect of the present invention, a method of acquisition of a received signal received from a Global Navigation Satellite System is provided, comprising:
obtaining a snapshot of the received signal;
correlating the snapshot with a locally-generated signal, wherein said correlating includes:
selecting a phase delay value indicative of an hypothesized phase delay of the locally-generated signal with respect to the snapshot; and
obtaining a partition of the snapshot and the locally-generated signal into corresponding pluralities of blocks, and
calculating partial correlation integrals for each block of said plurality of blocks, characterized in that
said corresponding pluralities of blocks include each a first block having a time duration related to the phase delay value.

The corresponding pluralities of blocks include each a plurality of second blocks that may have a predetermined time duration.

The corresponding pluralities of blocks may include each a final block having a time duration determined by a difference between the time duration of one of the second blocks and the time duration of the first block.

Said correlating may comprise obtaining cumulated correlation integrals by summing up the partial correlation integrals calculated for each block of said corresponding plurality of blocks.

Said summing up may comprise adjusting a sign of the partial correlation integrals based on at least one hypothesized time sequence of binary data of a navigation message modulating in phase the received signal.

Said correlating may be performed individually for in-phase and in-quadrature components of the snapshot and the locally-generated signals.

Said correlating may include obtaining an indication of a correlation integral between the locally-generated signal and the snapshot by adding up square absolute values of the cumulated correlation integrals for the in-phase and in-quadrature components.

The method may comprise repeating said summing up for at least two hypothesized time sequences of binary data of the navigation message.

The method may further comprise repeating said obtaining a partitioning of the snapshot and the locally-generated signal into a corresponding pluralities of blocks and calculating partial correlation integrals for each block of said plurality of blocks for at least two phase delay values indicative of two hypothesized phase delay of the locally-generated signal with respect to the snapshot.

Said correlating the snapshot with a locally-generated signal may comprise correlating the snapshot with at least two locally-generated signals each one having a tentative frequency related to a nominal frequency of the received signal corrected by a respective frequency correction factor, the time duration of the blocks of said pluralities being related to said tentative frequency.

Said frequency correction factor may be related to a Doppler shift value hypothesizing a Doppler shift experienced by the nominal frequency due to a relative motion between a transmitter of the received signal and a receiver of the received signal.

Said frequency correction factor may be related to a Doppler shift value hypothesizing a Doppler shift experienced by the nominal frequency due to an acceleration of a receiver of the received signal compared to a transmitter of the received signal.

The method may further comprise identifying a maximum between indications of correlation integrals calculated for the at least two hypothesized time sequences of binary data, the at least two hypothesized phase delay values and the at least two tentative frequencies.

The method may also comprise deriving, from the hypothesized time sequences of binary data of the navigation message that provides said maximum, information about the GPSTime of the satellite transmitter. A time of reception of the signal may also be estimated based on the estimated GPSTime of the transmitter, corrected taking into account a signal propagation delay from the satellite transmitter to the receiver.

Said at least two phase delay values, and/or said tentative frequencies related to a nominal frequency of the received signal corrected by a respective frequency correction factor, and/or said at least two hypothesized time sequences of binary data are selected within respective predetermined ranges of values. The method may further comprise exploiting assistance data received by a terrestrial radio communication network for determining said respective predetermined ranges of values.

According to another aspect of the present invention, a global navigation satellite system receiver is provided, comprising functional modules configured to:
obtaining a snapshot of the received signal;
correlating the snapshot with a locally-generated signal, wherein said correlating includes:
trying at least one phase delay value indicative of an hypothesized phase delay of the locally-generated signal with respect to the snapshot; and
obtaining a partition of the snapshot and the locally-generated signal into corresponding pluralities of blocks including each a first block having a time duration related to the phase delay value, and calculating partial correlation integrals for each block of said plurality of blocks.

The corresponding pluralities of blocks may include each a plurality of second blocks having a predetermined time duration.

In particular, the corresponding pluralities of blocks may include each a final block having a time duration determined by a difference between the time duration of one of the second blocks and the time duration of the first block.

Said functional modules configured for correlating may comprise functional modules configured for obtaining cumulated correlation integrals by summing up the partial correlation integrals calculated for each block of said corresponding plurality of blocks.

Said functional modules configured for summing up may comprise functional modules configured for adjusting a sign of the partial correlation integrals based on at least one hypothesized time sequence of binary data of a navigation message modulating in phase the received signal.

Said functional modules configured for correlating may be configured for performing said correlating individually for in-phase and in-Quadrature components of the snapshot and the locally-generated signals.

Said functional modules configured for correlating may include functional modules configured for obtaining an indication of a correlation integral between the locally-generated signal and the snapshot by adding up square absolute values of the cumulated correlation integrals for the In-phase and in-Quadrature components.

Said functional modules may be configured for repeating said summing up for at least two hypothesized time sequences of binary data of the navigation message.

Said functional modules may be configured for repeating said obtaining a partitioning of the snapshot and the locally-generated signal into corresponding pluralities of blocks and calculating partial correlation integrals for each block of said plurality of blocks for at least two phase delay values indicative of two hypothesized phase delays of the locally-generated signal with respect to the snapshot.

Said functional modules configured for correlating the snapshot with a locally-generated signal may comprise functional modules configured for correlating the snapshot with at least two locally-generated signals each one having a tentative frequency related to a nominal frequency of the received signal corrected by a respective frequency correction factor, the time duration of the blocks of said pluralities being related to said tentative frequency.

Said frequency correction factor may be related to a Doppler shift value hypothesizing a Doppler shift experienced by the nominal frequency due to a relative motion between a transmitter of the received signal and a receiver of the received signal.

Said frequency correction factor may in particular be related to a Doppler shift value hypothesizing a Doppler shift experienced by the nominal frequency due to an acceleration of a receiver of the received signal compared to a transmitter of the received signal.

The global navigation satellite system receiver may further comprise functional modules configured for identifying a maximum between indications of correlation integrals calculated for the at least two hypothesized time sequences of binary data, the at least two hypothesized phase delay values and the at least two tentative frequencies.

The global navigation satellite system receiver may further comprise functional modules configured for deriving, from the hypothesized time sequences of binary data of the navigation message that provides said maximum, information about the GPSTime of the satellite transmitter.

The global navigation satellite system receiver may further comprise functional modules configured for estimating a time of reception of the signal based on the estimated GPSTime of the transmitter, corrected taking into account a signal propagation delay from the satellite transmitter to the receiver.

Said at least two phase delay values, and/or said tentative frequencies related to a nominal frequency of the received signal corrected by a respective frequency correction factor, and/or said at least two hypothesized time sequences of binary data may be selected within respective predetermined ranges of values.

The global navigation satellite system receiver may comprise functional modules configured for exploiting assistance data received by a terrestrial radio communication network for determining said respective predetermined ranges of values.

BRIEF DESCRIPTION OF THE DRAWINGS

FIG. 1 schematically shows, partly in terms of functional blocks, an overview of a GPS system in which an embodiment of the present invention can be advantageously exploited;

FIGS. 2A, 2B and 2C schematically show the effect of a navigation message modulating a generic C/A code used to modulate (spread) a common radio-frequency carrier signal;

FIGS. 6A, 6B and 6C schematically show the effect on calculated correlations of phase modulation due to a navigation message;

FIG. 9 pictorially shows an exemplary configuration off GPS satellites in view at a reference location, adopted by the Applicant for performing comparative tests on prior-art GPS signal acquisition methods and a signal acquisition method according to an embodiment of the present invention; and FIGS. 10A and 10B, 11A and 11B, 12, 13 and 14A and 14B show results of the comparative tests.

DETAILED DESCRIPTION OF AN EMBODIMENT OF THE INVENTION

Figure 3:
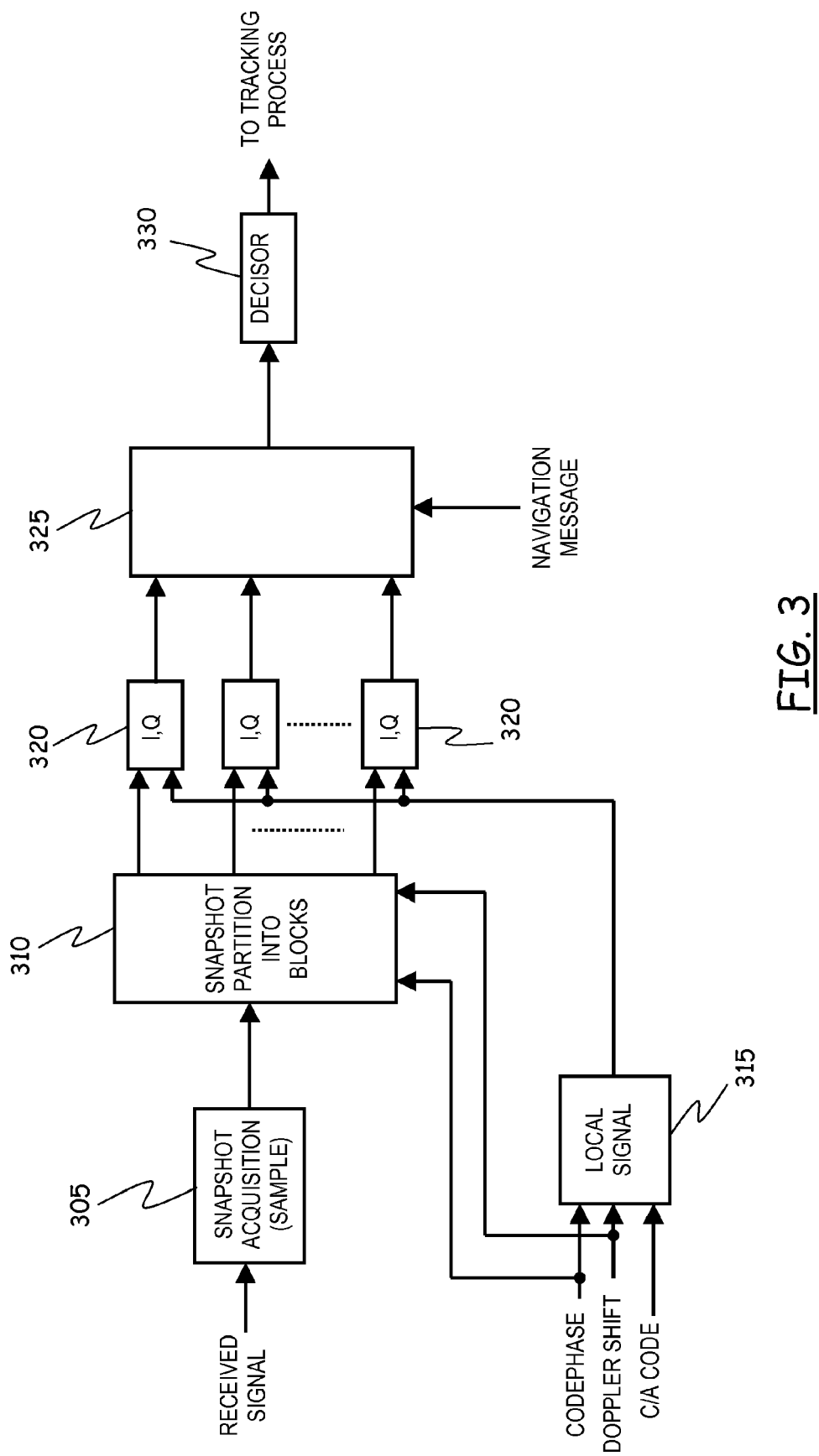
FIG. 3 schematically shows, in terms of functional blocks, an acquisition stage of a GPS receiver of the system of FIG. 1, according to an embodiment of the present invention.

In the following description, reference will be frequently made to the terms that are defined herebelow:

GPSTime: the time scale of the GPS satellite transmitters; it is implemented by atomic clocks at the GPS ground control center;

Codephase: a time delay value corresponding to a phase difference between the C/A code used to modulate the received signal and the C/A code used to modulate the receiver locally-generated signal for signal acquisition purposes;

Doppler bin: one of a set of discrete values of Doppler shifts used to correct the frequency of the locally-generated signal to match the Doppler shift experienced by the received signal in traveling from the satellite transmitter to the receiver;

Chip: one of the 1023 bits of the C/A spreading code used to modulate the transmitted signal.

Referring to the drawings, FIG. 1 schematically shows an overview of a GPS system in which an embodiment of the present invention can be advantageously exploited.

Reference numeral 105 denotes a signal source, e.g. a transmitter transported by one of the satellite vehicles of the constellation of satellite vehicles of the GPS. The signal source 105 is configured to transmit microwave radio carrier signals, particularly radio signals at the L1 frequency, modulated (spread) by a unique C/A code uniquely assigned thereto, by data bits making up a navigation message, and, possibly, by a P code.

Reference numeral 110 denotes a signal receiver, like a GPS receiver of a navigation tool, a mobile phone, a PDA, a palmtop, a PC with embedded a GPS receiver or having a peripheral device including a GPS receiver. The receiver 110 is configured to receive the signals transmitted by the signal source 105.

A terrestrial base station 115 of a terrestrial radio communication network 120, like for example a GSM (General System for Mobile communications) or a UMTS (Universal Mobile Telecommunications System) network, enables radio communication between the receiver 110 and a server 125, configured to provide assistance to the receiver 110 in the process of acquisition of the GPS signal; this scheme refers to a so-called "Assisted GPS"-A-GPS-architecture. However, as it will be made clear in the following, the present invention is not limited to the application in A-GPS architectures.

The generic satellite transmitter modulates the radio carrier at the L1 frequency using the C/A code uniquely assigned thereto; in particular, the C/A code is used to spread the signal bandwidth. The generic C/A code is a unique sequence of 1023 bits nominally (i.e., neglecting Doppler effects) 1 ms long, and thus having a nominal repetition frequency of 1 KHz. The signal thus obtained by modulating the L1 frequency radio carrier by the C/A code is further modulated in phase by the signal carrying the navigation message, which is a digital signal at 50 Hz nominal frequency; every bit of the navigation message nominally lasts 20 ms, thus every 20 ms the signal transmitted by the satellite transmitter potentially experiences a phase reversal or sign change or flip, depending on the value of the current and previous data bits in the data bits stream.

Referring to FIG. 2A, the graphic symbol identified by reference numeral 205 will be used through this description to graphically identify a unique, elementary sequence of 1023 bits making up a C/A code assigned to a particular satellite transmitter of the GPS constellation. The elementary sequence 205 is repeated every millisecond (nominally), with a repetition frequency of 1 KHz, as depicted in FIG. 2B; 20 repetitions of the elementary sequence 205 correspond to a time interval of 20 ms, which is the nominal bit time, i.e. the nominal duration of one data bit in the navigation message data bits stream. FIG. 2C schematically shows a snapshot of the length of 80 ms (corresponding to 4 consecutive data bits in the data bits stream that makes up the navigation message) of the modulation signal used by the generic satellite transmitter to modulate in phase the radio carrier at the L1 frequency (already modulated by the respective C/A code), corresponding to an exemplary sequence "+1, −1, −1, +1" of data bits in the navigation message 210; "+1" denotes a logic high level, whereas "−1" denotes a logic low level (the opposite convention may indeed be adopted). It can be appreciated that a change from a +1 data bit to a −1 data bit corresponds to a change in sign or flip or phase reversal of the signal (in the figure, the phase reversal is depicted as a reversal in the sign of the elementary sequences 205).

The radio-frequency GPS signal $s_{RF}^{(i)}(t)$ received by the receiver 110 from the generic, i-th satellite transmitter 105 may be described mathematically as:

$$s_{RF}^{(i)}(t) = \sqrt{2P_c} d^{(i)}(t-\tau) c^{(i)}(t-\tau) \cos[2\pi(f_{L1}+f_D^{(i)})(t-\tau)+\theta^{(i)}]$$

where:
$P_c$ is the received signal power;
$d^{(i)}(t)$ is the 50 Hz navigation message transmitted by the i-th satellite transmitter, whose value at the generic time can be +1 or −1, depending on the data bit;
$c^{(i)}(t)$ is the C/A PRN spreading code uniquely assigned to the i-th satellite transmitter;
$f_{L1}$ is the L1 carrier frequency (1575.42 GHz);
$f_D$ is a frequency shift due to Doppler effect, caused by the satellite-receiver relative motion; it varies in time in a way that can be described as $$f_D = f_{D\,base} + r_D \cdot t$$

where:
$f_{D,base}$ is the shift in frequency experienced by the transmitted signal due to the relative motion between the satellite transmitter and the receiver, and
$r_D$ is the so-called "Doppler rate", a parameter describing the drift in the radio carrier frequency caused by Doppler effect due to relative acceleration/deceleration between the satellite and the receiver;
$\tau$ is a signal propagation time from the satellite transmitter to the receiver;
$\theta^{(i)}$ is the phase offset between the local oscillators (and thus of the local clocks) of the satellite transmitter and of the receiver.

The signal received from the satellites is sampled for the successive signal processing; this involves lowering the carrier signal frequency to an intermediate frequency; the signal at the intermediate frequency is then sampled. In the practice, the received signal is often the composition of the signals transmitted by multiple transmitters, i.e. of multiple CDMA channels, which are multiplexed, using different C/A codes, over a single radio carrier at the L1 frequency; each CDMA channel is modulated in phase by the data bits making up the respective navigation message, peculiar of that satellite transmitter.

The sampled signal, also referred to as the "snapshot" of the received signal, is then correlated with a locally-generated signal, generated locally at the receiver using the nominal clock;

the locally-generated signal is a radio carrier at the intermediate frequency variously modulated, delayed and shifted in frequency to compensate frequency shifts due to the Doppler effect. The correlation is performed trying different C/A codes in the attempt to find the C/A code(s) that matches the C/A code(s) of the particular satellite transmitter(s) that might be overhead the receiver.

In greater detail, the receiver calculates separately the I and Q correlation integrals between the sampled signal and the locally-generated signal. By calculating separately and then combining the I and Q correlation integrals, the uncertainty about the phase of the received signal due to the phase offset $\theta^{(i)}$ between the oscillators of the satellite transmitter and the receiver can be reduced.

The I and Q correlation integrals are calculated trying a plurality of different hypothesized values of time delay between the received signal and the locally-generated signal and Doppler shifts in the modulation of the locally-generated radio carrier. The hypothesized Doppler shift is required to take into account the shift in frequency experienced by the transmitted signal due to the relative motion between the satellite transmitter and the receiver. The hypothesized time delay value takes into account the misalignment between the C/A code of the received signal and the one used to modulate the locally-generated signal, due to satellite transmitter-receiver signal propagation time; in other words, an hypothesized time delay value corresponds to a phase difference between the C/A code of the received signal and the C/A code used to modulate the locally-generated signal, thus it is also referred to as a "codephase".

A range of expected Doppler shift values (which, for a typical GPS receiver, ranges from ±5, in case the receiver is steady, to ±10 KHz, in case the receiver is moving) is divided into a discrete number of "Doppler bins", of width related to the integration time used to calculate the correlation between the received signal and the locally-generated signal; attempting different Doppler bins means attempting to correct the frequency of the locally-generated radio carrier by using different hypothesized Doppler shift values $f_{D,base}$, each one corresponding to the Doppler bin selected from time to time. For each Doppler bin, different possible values of codephase between the sampled signal and the locally-generated signal are tried.

When the Doppler shift and the time delay (codephase) applied to the locally-generated signal match those of the received signal snapshot, a peak in the result of the correlation integrals is detected. Peaks of different value correspond to different C/A codes attempted by the receiver; the highest peak or higher peaks correspond to the correct C/A code or codes, matching that or those of the satellite transmitters which are at that time overhead the receiver.

As mentioned in the introduction of the present description, when the received signal is degraded, like for example when the receiver is inside a building, the integration time, i.e., the duration of the received signal to be considered for the signal acquisition should be extended, to compensate for the signal degradation; snapshots of the length of some seconds may have to be considered, i.e. well beyond the duration of one navigation message data bit (20 ms); the correlation integral to be calculated thus spans multiple data bits in the stream making up the navigation message, and the phase reversals (sign flips) in the received signal due to the peculiar sequence of data bits in the transmitted navigation message should be taken into account to properly calculate the signal correlation.

Exploiting the A-GPS architecture, the (at least partial) knowledge of the sequence of data bits making up the navigation message is provided to the receiver by the server 125 as part of assistance data after the receiver 105 takes the snapshot of the received signal; the assistance data include the GPS satellite vehicle's orbit parameters (the almanac and the ephemeris), an indication of the delay of the satellite transmitter clock, clock corrections, and other parameters.

However, in order to fully exploit the information about the navigation message provided thereto by the assistance data, the receiver should also have time synchronization information (the GPSTime, which is the time scale implemented by atomic clocks at the GPS ground control center) useful for synchronizing the local clock with the satellite transmitter clock; such synchronization information should have a precision of the order of 1 ms or less, like for example 100 µs (the nominal length of the elementary C/A code sequence 205); a sufficiently precise synchronization information in combination with the knowledge of the navigation message allows simplifying the search process carried out by the receiver in the acquisition stage. Indeed, a misalignment between the sampled signal and the locally-generated signal of 1 ms or more may cause a lowering of the calculated correlation integral.

The server 125 also provides to the receiver 110, as part of the assistance data, a time indication, which takes into account an estimation of the receiver location made by the terrestrial radio communication network 120); however, the time indication provided by the server 125 to the receiver 110 is not sufficiently precise: due to the fact that the terrestrial radio communication network 120 may be not synchronous to the GPS transmitters, the precision by which the receiver may know the GPSTime is, in practical applications, of 2-3 s, thus far less precise than what requested. A further contribution to the imprecision of the time indication made available to the receiver by the server could also be originated by the uncertainty about the exact location of the receiver; however, the imprecision on the time indication due to the uncertainty of the receiver exact location (which may be of the order of a few kilometers) may amount to about 5 µs, and thus it is negligible compared to the imprecision due to the fact that the network is not synchronous to the GPS transmitters Thus, in the signal acquisition operation the receiver should calculate the correlation integrals for several different hypothesized delays experienced by the transmitted signal, at steps of ½ or ¼ chip; the sampled signal should be correlated with the locally-generated signal changing the alignment of the two signals over the range of uncertainty of the GPSTime received as part of the assistance data, taking into account the phase delay and the navigation message.

According to an embodiment of the present invention, for the acquisition of the signal transmitted by the satellite transmitters, the receiver 110 calculates the correlation integrals by subdividing the snapshot and the locally-generated signal into several blocks. For each C/A code to be tried, the receiver calculates correlation integrals in respect of several different possible partitions into blocks of the snapshot and of the locally-generated signal. The generic partition into blocks of the two signals is characterized by comprising a first block of duration equal to a respective fraction of the duration of the C/A code elementary sequence 205, a plurality of subsequent blocks, each one of duration equal to the duration of the C/A code elementary sequence 205, and a last block representing the interval between the begin of a C/A code elementary sequence 205 and the sample of the locally-generated signal that allows having a number of samples of the locally-generated signal equal to the number of samples making up the sampled signal. In other words, the first block of the generic block partition has a duration that corresponds to a portion of the elementary C/A code sequence 205, starting from an intermediate point corresponding to a certain hypothesized delay and ending at the end of the elementary C/A code sequence; the first block thus has a duration that corresponds to a particular hypothesized time delay, i.e. to a particular hypothesized codephase.

Partial I and Q correlation integrals are calculated for each block of the snapshot and of the locally-generated signal; the partial I and Q are then summed up to obtain I and Q correlation integrals, which provide an approximation of the correlation between the I and Q components of the two signals. In calculating the partial correlation integrals, no account is taken of the possible phase reversals within the blocks due to the navigation message. The navigation message is taken into account at a later stage, when the plurality of calculated partial correlation integrals (one for each block of the partition) are summed up to obtain the I and Q correlation integrals. The absolute value of the I and Q correlation integrals thus calculated are then squared, and added to each other: an overall correlation integral is thus obtained. The highest peak in the different overall correlation integrals thus obtained in respect of different partitions into blocks (i.e., different codephases), different Doppler bins (i.e., different frequency shifts), and different alignments to the locally-generated signal of the navigation message data bits stream received with the assistance data identifies the proper phase delay, Doppler shift and alignment with the navigation message.

FIG. 3 schematically shows, in terms of functional blocks, the acquisition stage of the receiver 110, adapted to perform the acquisition of the GPS signal, according to an embodiment of the present invention.

The received signal (received by a receiving section of the GPS receiver 110, not shown in the drawings because per-se known) is fed to a snapshot acquisition block 305, which obtains a snapshot of prescribed length of the received signal; in particular, the snapshot acquisition block 305 samples the received signal at a pre-selected sampling frequency, and takes a succession of samples.

The snapshot is partitioned into a plurality of blocks by a block 310. The partition into blocks is made according to a selected codephase and a selected Doppler shift (corresponding to a selected Doppler bin); the Doppler shifts affects the block partition because it causes the duration of the elementary sequence 205 to depart from the nominal duration of 1 ms.

A locally-generated signal to be correlated to the received signal snapshot is generated locally at the receiver, by a local signal generation block 315. The locally-generated signal includes a carrier signal at the L1 frequency, corrected by the selected Doppler shift (corresponding to the selected Doppler bin) is modulated by a selected C/A code. The locally-generated signal is partitioned into blocks, similarly to the snapshot, according to the selected codephase and the selected Doppler shift.

I and Q partial correlation integrals are then calculated in respect of the different, corresponding blocks of the snapshot and of the local signal. The I and Q partial correlation integrals may be calculated in parallel by a plurality of I and Q correlator blocks 320; alternatively, the I and Q partial correlation integrals may be calculated in succession.

In order to sum up the I and Q partial correlation integrals calculated for the considered block partition to obtain cumulated I and Q correlation integrals, the signs of the partial correlation integrals are adjusted taking into account the (portion of the) navigation message (in the time span that correspond to the snapshot length). Due to the uncertainty of the local clock compared to the GPSTime, several attempts of sign corrections are made, each attempt corresponding to an hypothesized positioning in time of the navigation message with respect to the snapshot. In block 325, for each hypothesized time positioning of the navigation message with respect to the snapshot, different cumulated I and Q correlation integrals are thus obtained. Block 325 also calculates the squared absolute value of the cumulated I and Q correlation integrals, and adds up the squared absolute values corresponding to an hypothesized time positioning of the navigation message with respect to the snapshot to obtain an overall correlation integral.

A decision block 330 determines the overall correlation integral having the highest value among the overall correlation integrals calculated for the different Doppler shifts, codephases and alignments of the navigation message data bits sequence. These operations are repeated for different C/A codes. A satellite signal is considered acquired when the highest value among the overall correlation integrals calculated for the different Doppler shifts, codephases and alignments of the navigation message data bits sequence exceeds a predetermined threshold for at least two different snapshots, and/or when the correlation peak is sufficiently higher than the noise.

A method according to an embodiment of the present invention will be hereinafter described in greater detail.

The receiver 110 builds the locally-generated signal by modulating the locally-generated radio carrier at the L1 frequency (corrected, as will be described later, by the hypothesized Doppler shift) with different (possibly all the) C/A codes assigned to the different satellite transmitters; at this stage, the navigation message that is actually superimposed on the signals transmitted by the satellite transmitters is neglected (this means that, according to an embodiment of the present invention, in the generation of the local signal it is assumed that all the data bits of the navigation message are equal to +1, or, equivalently, all equal to −1, i.e. that no phase reversals occur).

For the generic C/A code, the locally-generated signal is treated as a succession of a discrete and finite number of blocks; the first block has a duration which is a fraction of the duration of the elementary C/A code sequence 205 (nominally, 1 ms, neglecting the Doppler shift effect, that, as will be described later, dilates the chip time, i.e. the duration of the single bit in the elementary sequence 205, and thus the duration of the elementary sequence 205 as a whole); all the successive blocks except the last one have each a duration equal to that of the elementary C/A code sequence 205, whereas the last block has a duration equal to the interval between the begin of a C/A code elementary sequence 205 and the sample of the locally-generated signal that allows having a number of samples of the locally-generated signal equal to the number of samples making up the sampled signal. A similar partition into blocks is applied to the sampled signal (i.e., to the snapshot), and the receiver calculates the correlation between the locally-generated signal and the sampled signal by calculating individual, partial correlation integrals of the two signals on every one of the blocks of the snapshot and of the local signal, and then summing the individual correlation integrals. This process is repeated changing the duration of the first block of the block partition, which amounts to changing the subdivision into blocks of the two signals, so as to estimate the correct phase (i.e., the actual delay) of the received signal.

Figure 4A:
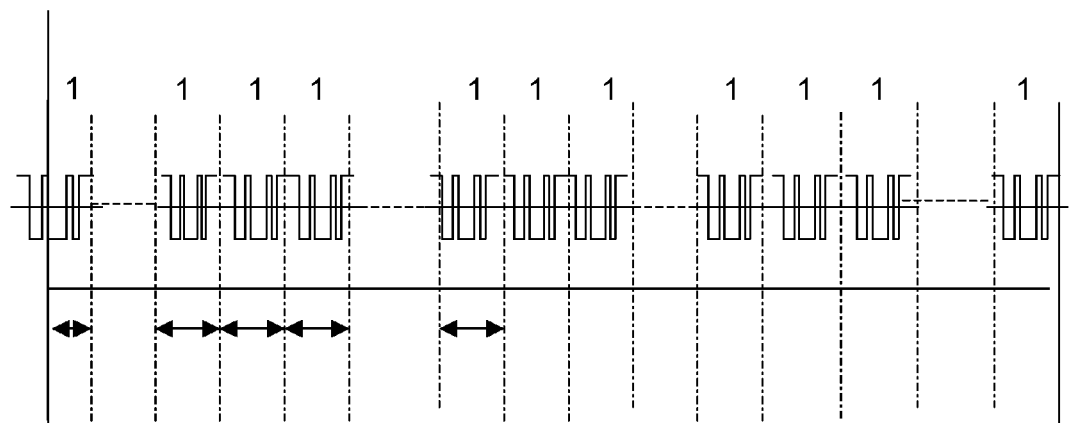
FIGS. 4A and 4B schematically show two exemplary partitions into blocks of a locally-generated signal used by the receiver for performing the signal acquisition.
Figure 4B:
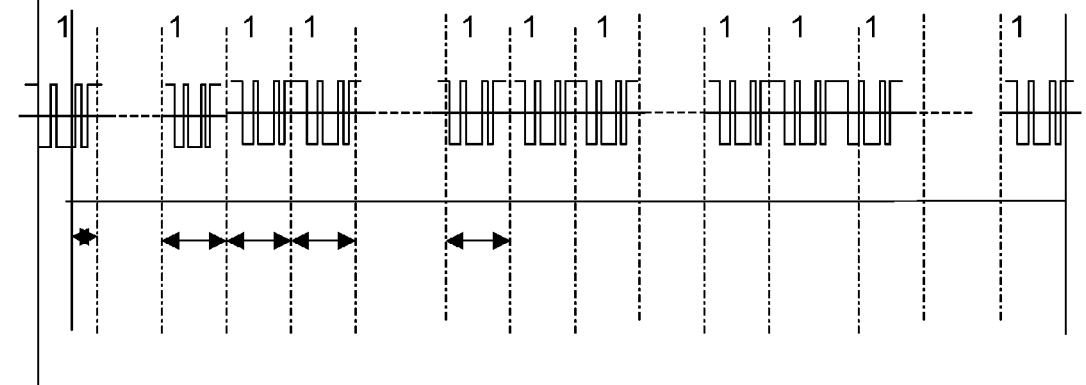

Referring to FIGS. 4A and 4, there are schematically shown two exemplary partitions into blocks of the locally-generated signal 405: in the two block partitions, the first block has a different duration, equal to different fractions of the duration of the C/A code elementary sequence that correspond to that fractions of the C/A code elementary sequence comprised between the hypothesized phase delays, in respect of which the correlation is to be calculated, and the end of the C/A code elementary sequence; the successive blocks in the partition have each a duration equal to the duration of the C/A code elementary sequence 205, and the last block has an extended duration determined as discussed above.

For each C/A code, the receiver tries various carrier frequencies, which correspond to the nominal L1 frequency corrected by frequency shifts corresponding to different Doppler bins. In particular, depending on the selected Doppler bin, the repetition period P of the C/A code (and thus the chip rate) changes compared to the nominal value (1 ms), according to the formula:

$$P=0.001*(1-f_D/1575420000)$$

where $f_D$ is the carrier frequency correction value corresponding to the selected Doppler bin.

In other words, given a C/A code, for each hypothesized Doppler shift correction (i.e., for each selected Doppler bin), denoted in the formulas by the apex d, and for each hypothesized codephase (i.e., for each possible partition into blocks of the snapshot and of the local signal), a local signal $l^d$ is built by concatenating a number M of blocks $M_1^{r,d}$ $M_2^{r,d}$ ... $M_{M-1}^{r,d}$ $M_M^{r,d}$ (where the apex r identifies the particular hypothesized codephase) of duration $T_i^d$ (with i=1, ..., M). The block $M_1^{r,d}$ (the first block in the partition) represents the fraction of the C/A code elementary sequence 205 comprised between the hypothesized phase delay for which the correlation with the sampled signal is to be estimated, and the end of the C/A code elementary sequence 205. Each of the blocks $M_2^{r,d}$ to $M_{M-1}^{r,d}$, i.e. each of the intermediate blocks in the block partition, has a duration that corresponds to one C/A code elementary sequence. The block $M_M^{r,d}$, i.e. the last block in the partition, represents the interval between the begin of a C/A code elementary sequence 205 and the sample of the locally-generated signal that allows having a number of samples of the locally-generated signal equal to the number of samples making up the sampled signal.

For each block $M_1^{r,d} M_2^{r,d} ... M_{M-1}^{r,d} M_M^{r,d}$, the chip rate value is the nominal chip rate (1 ms) corrected by the frequency corresponding to the selected Doppler bin, so as to take into account the Doppler shift. Thus, the duration $T_i^d$ of the generic block is in general not equal to the nominal one, being instead given by:

$$T_i^d=0.001 \cdot (1-(f_{bin}+r_d \cdot (i-1+frc) \cdot 0.001)/1575420000)$$

where $f_{bin}$ denotes the value of the selected Doppler bin, frc is the fraction of one period expressing the duration of the first block, and i is an index identifying the generic block in the partition.

The number of samples in each block depends on the duration of that block, and is given by:

$$NSamp_i^d = T_i^d \cdot f_s$$

where $f_s$ is the sampling frequency.

This spreading C/A code is used to modulate a radio carrier whose frequency is given by the Doppler bin selected from time to time for calculating the correlation with the sampled signal (the snapshot).

To this purpose, the snapshot is partitioned into a same number of blocks as the locally-generated signal, selecting, for each block, a same number of samples as those included in the corresponding block of the locally-generated signal. Different durations of the first block of the partition are considered, as in the case of the locally-generated signal.

Figure 5A:
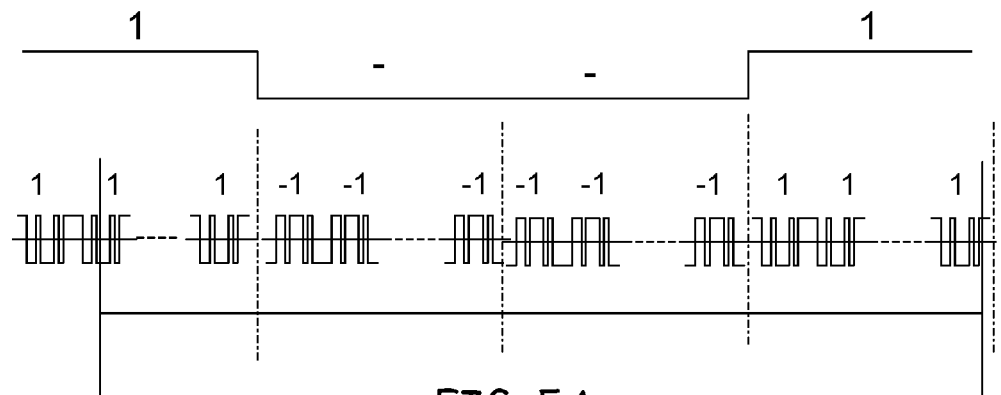
FIGS. 5A, 5B and 5C schematically shows a received signal snapshot, and two exemplary partitions into blocks thereof, according to an embodiment of the present invention.
Figure 5B:
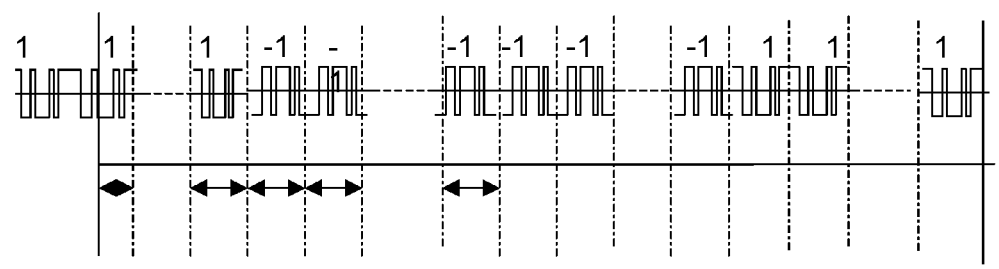
Figure 5C:
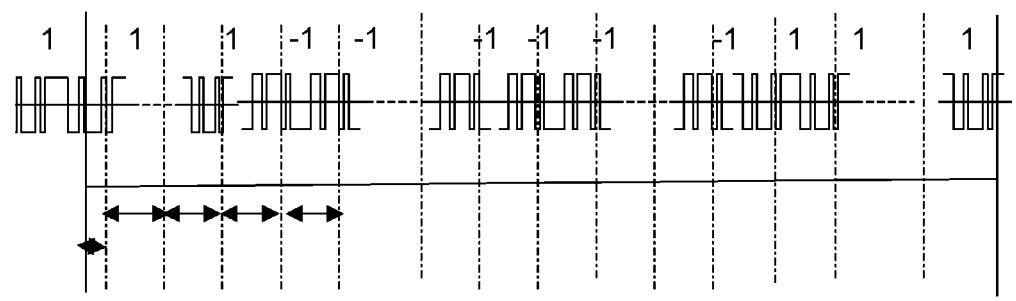

FIG. 5A schematically shows a portion of an exemplary snapshot, corresponding to 80 ms of the received signal, assuming by way of example that the navigation message, in the considered signal portion, is "+1, −1, −1, +1". FIGS. 5B and 5C depict two exemplary different partitions into blocks of the signal portion of FIG. 5A; in particular, FIG. 5B corresponds to a block partition with a first block duration corresponding to an hypothesized phase delay that matches the actual phase delay of the received signal, whereas FIG. 5C corresponds to a block partition with a first block duration corresponding to an hypothesized phase delay that does not match the actual phase delay of the received signal.

The correlation between the locally-generated signal and the snapshot is calculated, and, for each hypothesized Doppler shift (i.e., for each Doppler bin attempted), and for each hypothesized phase delay (i.e., first block duration), a number M+1 of correlation integrals is obtained (where M+1 is the number of blocks in the partition); since the signals are sampled, the correlations integrals actually are correlation summations, each one performed on a number $NSamp_i^d$ of samples of the locally-generated signal and a number $NSamp_i^d$ of corresponding samples of the snapshot.

In particular, the first correlation summation is performed between the samples of the locally-generated signal belonging to the fraction of C/A code elementary sequence from the considered phase delay and the end of the C/A code elementary sequence, and a same number of first samples of the snapshot:

$$Int_0^{r,d} = \sum_{k=1}^{NSamp_0^d} s_k \cdot l_{r+k}^d \cdot e^{j2\pi\left((F_{if}+f_d)\frac{k}{fs}+\frac{1}{2}r_d \cdot \left(\frac{k}{fs}\right)^2\right)}.$$

Each of the successive M−2 correlation summations is performed between the samples of the generic intermediate block (of duration equal to that of the C/A code elementary sequence 205) of the locally-generated signal and the corresponding samples of the snapshot:

$$Int_1^{r,d} = \sum_{k=1}^{NSamp_1^d} s_{k+NSamp_0^d} \cdot l_{r+k+NSamp_0^d}^d \cdot e^{j2\pi\left((F_{if}+f_d)\frac{k+NSamp_0^d}{fs}+\frac{1}{2}r_d \cdot \left(\frac{k+NSamp_0^d}{fs}\right)^2\right)}$$

The last correlation summation is performed between the samples of final fraction of C/A code elementary sequence in the last block of the partition of the locally-generated signal and the corresponding final samples of the snapshot:

$$Int_M^{r,d} = \sum_{k=1}^{NSamp_M^d} s_{k+\sum_{i=0}^{M-1} NSamp_i^d} \cdot l_{r+k+\sum_{i=0}^{M-1} NSamp_i^d}^d \cdot$$
$$e^{j2\pi\left((F_{if}+f_d)\frac{k+\sum_{i=0}^{M-1} NSamp_i^d}{fs}+\frac{1}{2}r_d \cdot \left(\frac{k+\sum_{i=0}^{M-1} NSamp_i^d}{fs}\right)^2\right)}.$$

In the above formulas, $l_{r+k}^d$ represents the k-th sample of the locally-generated signal $l^d$ corresponding to a selected Doppler bin d and that begins with a C/A code delay r; $s_k$ are the samples of the snapshot; $f_d$ is the frequency corresponding to the selected Doppler bin; $r_d$ is the Doppler rate; $f_s$ is the sampling frequency, $F_{if}$ is the intermediate frequency at which the received signal at the L1 frequency has been lowered prior to sampling it.

The results of the correlation summations are complex numbers that include both the I (real part) and the Q (imaginary part) signal components.

A choice of the initial block duration resulting in a partition of the snapshot into a succession of blocks equal to one C/A code elementary sequence, or to a fraction thereof, in the case of the first block, which is not offset by a delay compared to the locally-generated signal, like in the example of FIG. 5B, will, when the partial correlation integrals are properly summed up, provide a correlation peak; for a block partition that is not synchronous with the leading fronts of the C/A code elementary sequences, like in the example of FIG. 5C, the peak will not be present, and noise will be obtained.

Up to now, the phase modulation of the received signals by the navigation message has not been taken into consideration. However, the possible phase reversal experienced by the received signal when the navigation message data bit changes from +1 to −1 or vice versa affects the result of the correlation summations calculated on the blocks of the considered block partition, as depicted schematically in FIGS. 6A and 6B.

In order to coherently add up the M+1 correlation integrals calculated for the M+1 blocks of the generic block partition and Doppler bin, the possible phase inversions experienced by the snapshot as a consequence of the changing values of the data bits making up the navigation message need to be taken into account.

As mentioned in the foregoing, under the assumption of operating in an A-GPS architecture, the receiver 110 receives from the server 125, as part of the assistance data, the sequence of data bits corresponding to the navigation message broadcast by each satellite transmitter, and, in case the network 120 is not synchronous with the GPS transmitters, an imprecise information about the GPSTime associated therewith. Thus, the precise GPSTime corresponding to the beginning of the snapshot taken by the receiver is unknown. To resolve this ambiguity, different possible alignments of the snapshot with the sequence of data bits transmitted during the time interval in which the snapshot is taken needs to be assessed.

Figure 7A:
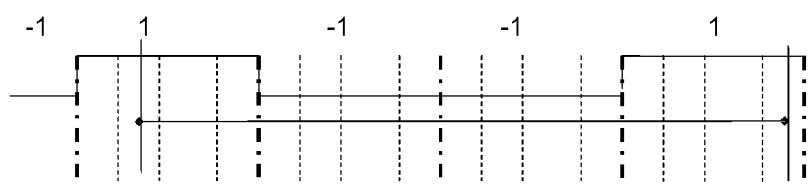
FIGS. 7A to 7D schematically show different possible alignments of a sequence of navigation message data bits with the received signal snapshot.
Figure 7B:
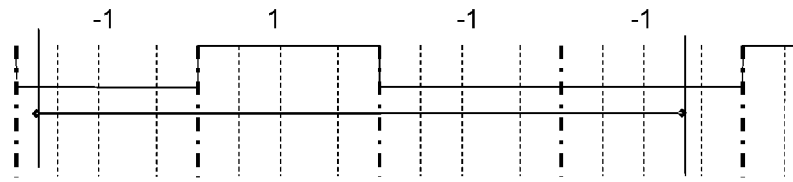
Figure 7C:
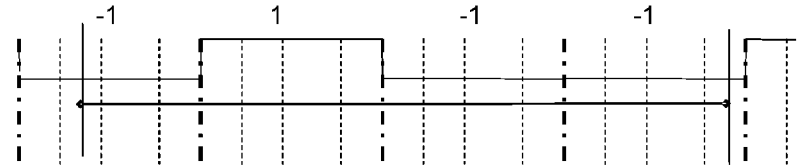
Figure 7D:
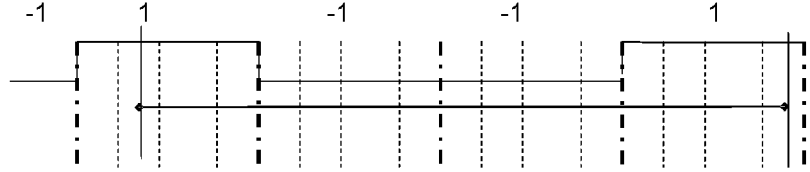

FIG. 7A schematically shows an exemplary sequence of data bits of the navigation message modulating the considered snapshot of the received signal. FIGS. 7B, 7C and 7D depict three tentative alignments to the snapshot of the same sequence of data bits, which the receiver receives as part of the assistance data from the server; it can be seen that the alignments of FIGS. 7B and 7C are not correct, whereas the alignment of FIG. 7D is correct.

For every tentative alignment, the generic correlation summation previously calculated for a corresponding block in the considered partition is multiplied by +1 or −1, depending on the value of the data bit in the time interval where that block falls, and the M+1 correlation summations, with proper sign, are added up, separating the I and the Q signal components; I and Q global correlation values are thus calculated. The overall correlation value $P^{r,k}$ is then calculated by adding up the square of the I and Q overall correlation values; the overall correlation value $P^{r,k}$ may be expressed as:

$$k \in [0, N_{ms}]$$

$$P_k^{r,d} = \left| \sum_{t=0}^{20-(k \bmod 20)-1} Int_{t-1}^{r,d} \cdot B_{floor(k/20)} + \sum_{t=(20-k \bmod 20)}^{M} Int_t^{r,d} \cdot B_{1+floor((t-(20-k \bmod 20))/20)+floor(k/20)} \right|^2$$

where $B_0 \ldots B_{n_{ms}}$ denotes the sequence of data bits making up the navigation message transmitted in the time interval in which the snapshot is taken; the data bit sequence forming the navigation message is, as mentioned in the foregoing, provided to the receiver as part of the assistance data, along with the GPSTime; exploiting this information, and based on the duration of the snapshot, the receiver selects the sequence $B_0 \ldots B_{n_{ms}}$; $N_{ms}$ is the number of milliseconds necessary for transmitting the sequence $B_0 \ldots B_{n_{ms}}$; it is $N_{ms}=20 \cdot n$, because each bit is transmitted modulating with the same value 20 consecutive C/A code elementary sequence repetitions; k denotes the delay, in ms, of the tentative sequence $B_0 \ldots B_{n_{ms}}$ compared to the data bit sequence received as part of the assistance data; d identifies the selected Doppler bin; r identifies the selected delay (code-phase).

From the above formula, it can be appreciated that the navigation message sequence of bits is reconstructed at steps of 1 ms, i.e. trying several possible delay values, at steps of 1 ms.

The correct alignment of the data bit sequence can be detected because it maximizes the sum of the M+1 correlation integrals. In other words, by identifying the value of delay k that maximizes the value of $P^{r,k}$ the correct data bit sequence alignment can be deduced.

This process is repeated for different possible values of the initial delay (i.e., for different code-phases) and for different possible Doppler bin.

The correct code-phase and the correct Doppler bin are then determined by identifying the maximum value (peak), in the time-frequency space (the so-called "search space") defined by all the possible values of Doppler shifts and phase delay and alignment of the data bit sequence. Indeed, only for the correct code-phase and Doppler bin no phase changes are experienced within the blocks of the considered partition of the snapshot.

Based on the value of the peak, the signal is considered acquired.

Once the alignment of the navigation message data bit sequence that maximizes the correlation peak, the information about the GPSTime of the satellite transmitter can be derived. The GPSTime thus derived, corrected taking into account the signal propagation delay from the satellite transmitter to the receiver, can provide an estimation of the time (in the GPS time base) the signal has been received by the receiver.

In an embodiment of the present invention, the signal acquisitions after the first (for different satellite transmitters) may be performed by trying only the navigation message data bit sequence synchronous with that identified in the first signal acquisition, properly delayed of a number of repetitions (in ms) derived from the assistance data exploiting the reference position. Since however the identification of the navigation message data bit sequence that maximizes the correlation peak might be affected by errors, in alternative embodiments of the invention it might be useful to independently estimate, for every satellite transmitter, the correct alignment of the navigation message data bit sequence.

In this way, according to an embodiment of the present invention, the uncertainty regarding the correct sequence of data bits is resolved only at the level of the sum of the M+1 correlation summations calculated for the M+1 blocks of the generic block partition of the snapshot and the locally-generated signal. No additional correlation integrals need to be calculated, with a substantial benefit in terms of computational burden. It is thus possible to successfully perform the acquisition of very feeble signals, as it is often the case in indoor environments, by suitable extending the duration of the acquired snapshot to some seconds, so as to maximize the processing gain, compatibly with the computational and supply power resources available at the receiver.

Figure 8:
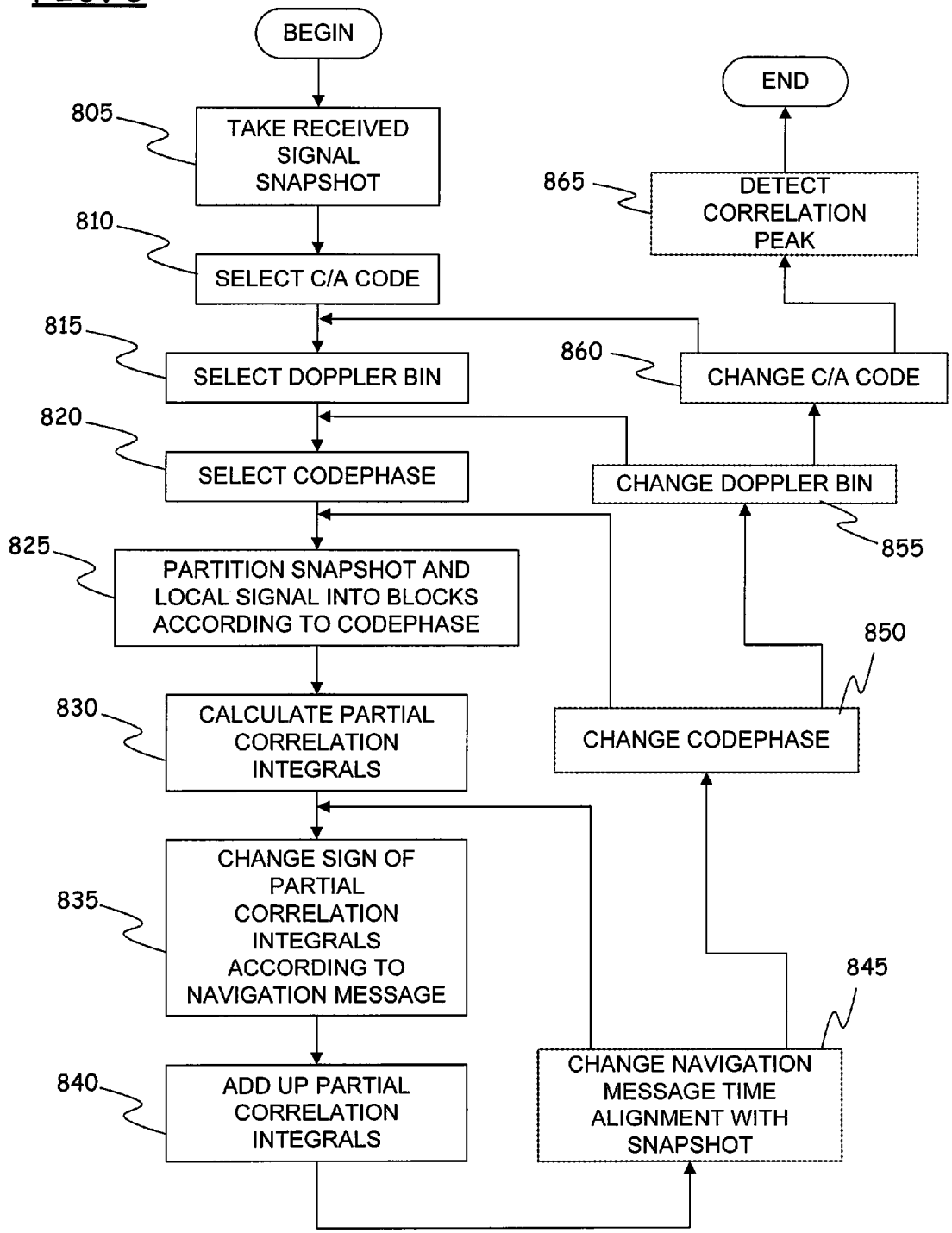
FIG. 8 is a schematic flowchart illustrating a method according to an embodiment of the present invention.

The method according to an embodiment of the present invention is schematized in the flowchart of FIG. 8.

After taking a snapshot of pre-selected length of the received signal (block 805), a first C/A code is selected for the modulation (spreading) of the locally-generated radio-frequency carrier (block 810).

Then, an hypothesized Doppler bin is selected (block 815) for the compensation of the Doppler effects experienced by the received signal.

An hypothesized codephase is then selected (block 820).

The snapshot and the locally-generated signal are then partitioned into blocks, as described in the foregoing, according to the selected codephase (block 825); the length of the first block depends on the selected codephase, whereas the successive blocks have a fixed length, equal to the length of the elementary C/A code sequence.

Partial (I and Q) correlation integrals are then calculated for the different blocks (block 830).

The sign of the calculated partial correlation integrals is then adjusted taking into account the navigation message and a selected, hypothesized time alignment thereof with the snapshot (block 835).

The partial correlation integrals, with proper sign, are then added up (block 840), to obtain I and Q correlation integrals, which are then squared in absolute value to obtain overall I and Q correlation integrals; the I and Q overall correlation integrals are then added to each other.

Then, blocks 835 and 840 are repeated for different alignments of the navigation message (block 845), for example changing it by steps of 1 ms.

When all the possible navigation message alignments have been tried, the codephase is changed (block 850), and blocks 825 to 845 are repeated; changing the codephase means varying the length of the first blocks in the block partitions of the snapshot and locally-generated signal.

When all the possible codephases have been tried, the Doppler bin is changed (block 855), and blocks 820 to 850 are repeated.

Finally, when all the possible Doppler bins have been tried, a different C/A code is tried (block 860).

After having calculated the correlation integrals for all the possible navigation message alignments, codephases, Doppler bins and C/A codes, the correlation peak is determined (865).

It is pointed out that albeit in the above description the operations are performed sequentially, nothing prevents from performing two or more operations in parallel (for example, the calculation relating to two or more different C/A codes may be performed in parallel). Also the calculations of the partial correlation integrals may be performed serially or in parallel.

It is pointed out that, in alternative embodiments of the present invention, like for example in scenarios where the receiver is not provided with assistance data, the sequence of data bits making up the navigation signal may be unknown to the receiver. In this case, all the possible combinations of data bits are considered. The processing complexity, as far as the calculation of the partial correlations $Int_n^{r,d}$ is considered, is similar to the case in which the data bit sequence is known; a difference resides in the number of coefficients $P_k^{r,d}$ to be calculated for each delay r and Doppler bin d: in particular, the number of the coefficients $P_k^{r,d}$ increases exponentially with the increase of the length of the integration interval, and is equal to $$N = 20 * 2^{\frac{T\_int}{0.02}},$$

wherein the factor 20 is due to the fact that, for each combination, all the possible delays of the first bit transition are considered, varying the delay value from 1 to 20 at steps of 1 ms. Thus, the increased computation complexity due to the fact that the data bit sequence is unknown can be still acceptable for integration intervals of the order of some hundreds of ms (some thousands of possible combinations of data bit values).

Preferably, the drift in the radio carrier frequency (even if already corrected by the Doppler bin) caused by Doppler effects caused by acceleration/deceleration of the receiver, which may be non-negligible when dealing with snapshots of the order of some seconds, should be considered and compensated. This effect is described by the Doppler rate $r_d$, a parameter which is also provided to the receiver as a part of the assistance data.

Should the receiver be subject to acceleration/deceleration during the acquisition process, the carrier frequency of the received signal may vary. In order to limit the effects of possible acceleration/deceleration of the receiver during the acquisition phase, the coherent integration may be carried out over two or more fractions (sub-intervals) of the overall acquisition time (interval). For example, a snapshot of 2 seconds may be subdivided into four sub-intervals of 0.5 s each. Each sub-interval is partitioned into a respective set of consecutive blocks. The correlation value $P_k^{r,d}$ may be calculated by performing the above described calculations on each of the four sub-intervals, calculating partial correlation values $P_k^{r,d,(n)}$, with n being an index identifying the generic sub-interval. The correlation value $P_k^{r,d}$ is thus given by:

$$P_k^{r,d} = \sum_n P_k^{r,d,(n)}$$

where:

$$P_k^{r,d,(n)} = \left| \sum_{t=L_{n-1}+(20-k \bmod 20)}^{L_n} Int_t^{r,d} \cdot B_{1+floor((t-(20-k \bmod 20))/20)+floor(k/20)} \right|^2 ;$$

$L_n$ denotes the upper limit of the generic sub-interval n, in terms of number of blocks.

Alternatively, the receiver may be equipped with an inertial system, adapted to estimate variations (due for example to acceleration/deceleration of the receiver) in the carrier signal frequency during the signal acquisition and integration time. The inertial system may include a three-axis accelerometer, a three-axis gyroscope and a three-axis magnetometer, so as to be capable of performing acceleration/deceleration measures; exploiting a reference position received as part of the assistance data, the acceleration/deceleration measures can be expressed in the ECEF (Earth-Centered, Earth-Fixed) coordinate system. It is thus possible to estimate the Doppler variation of the carrier frequency during the coherent integration time caused by acceleration/deceleration experienced by the receiver, for the signals transmitted by the different satellites overhead the receiver.

In an embodiment of the present invention, the frequency-phase delay search space may be restricted by detecting the set of values related to the phase of the C/A code (codephase values) at the beginning of the acquired snapshot. In case information regarding the offset of the clock and assistance data are available at the receiver, the set of values related to the phase of the C/A code may be restricted to an uncertainty interval (instead of having to attempt all the possible codephase values), the width of which depends on the precision with which the reference position may be known. The reference position can be calculated using localization techniques adopted to localize mobile terminals, for example based on the cellular structure of the mobile telephony network. In urban areas, the uncertainty on the reference position may be below 500 m, and this corresponds to an uncertainty of +/−2 chips around the estimated value (which depends on the codephase value received with the assistance data and on the offset); outside urban areas, the uncertainty on the reference position may be reasonably assumed to be lower than 3 Km, which corresponds to +/−3 chips. However, this information is per se not sufficient, because of the uncertainty about the time of start of the snapshot, being the receiver local clock not synchronous with the satellite transmitter clock.

In a possible practical implementation, the computation complexity may be kept low by acquiring, exploiting block-processing techniques, the signal of a satellite transmitter that experiences the higher signal-to-noise ratio (not necessarily a signal having a signal-to-noise ratio sufficiently high to enable demodulating the navigation message). Codephase and Doppler shift measures are performed on this signal. Based on the measures performed on this signal, and on the codephase and Doppler shift received as a part of the assistance data, it is possible to estimate the clock parameters of the receiver, offset and drift.

Once the codephase and the Doppler shift measures are available, the block partition and partial correlation calculation block-processing algorithm is exploited for estimating the alignment of the navigation message data bit sequence, and thus for estimating the GPSTime of transmission of the signal. This operation may be performed directly on the feeble signals without repeating the calculations of the partial correlation integrals.

By exploiting the assistance data it is possible to reduce the number of Doppler bins to be tried: the set of Doppler bins to be tried can be restricted the more precise is the model of clock available, in terms of frequency offset estimation.

It is observed that the calculation of the partial correlation integrals should not be simultaneously performed on a strong signal and on a feeble signal, because cross-correlation (code interference) phenomena prevent from applying the block-processing technique on the feeble signal.

In order to detect the peak in the correlation value, the steps with which the codephase value should be varied for trying different possible delay values may be equal or higher than ½ chip; when operating at the lowest sampling frequency, equal to 4 MHz, it is necessary to calculate the correlation with a point every 2 samples of the local signal. By choosing a finer step, like ¼ chip, the sensitivity may be increased (0.5 dB in the best case, 0.25 dB on average), but at the cost of an increased computation complexity. In a possible practical implementation, a coarser sampling step may be chosen at the beginning of the acquisition process; then, once a correlation peak is detected, a finer sampling step may be chosen (e.g., 4 MHz, 8 MHz, 20 MHz or higher) to improve the time resolution, but limiting the calculations to the neighborhood of the previously detected peak. In this way, an open-loop tracking of the received signal may be implemented. One possibility may be to increase the sampling frequency and select the maximum, with a 10 MHz delfront-end filter for a 20 MHz sampling frequency.

The sensitivity of the acquisition algorithm according to the described embodiment of the invention depends on the length of integration interval on which the correlation between the snapshot and the locally-generated signal is calculated. The length of the integration interval can be varied dynamically (based on the length of the snapshot); for example, the length of the integration interval can be increased, starting from an initial value, until a peak exceeding a predetermined value in the correlation is reached, or until the duration of the snapshot is reached. A doubling of the integration internal length gives a 3 dB increase of sensitivity. The increase in the length of the integration interval translates into an increase in the number M of partial correlations to be calculated; the partial correlations previously calculated for a shorter integration interval: it is sufficient to freshly calculate the missing partial correlations. Also the calculations necessary for taking into account the modulating data bit stream and calculating the values $P_k^r$ need not be repeated: it is sufficient to subtract the last partial correlation $\text{Int}_M^{r,d} \cdot B_N$ from the result obtained for the previous choice of integration interval length, and add the freshly calculated $\text{Int}_n^r \cdot B_j$.

Also, the step at which the delay is varied may be changed dynamically, and be for example from ½ chips and ¼ chips.

The method according the present invention can be exploited also in a closed-loop tracking stage, in order to save computation power compared to an open-loop tracking. As known in the art, the tracking stage follows the acquisition stage (during which coarse phase and Doppler shift estimations are made) and is directed to lock the carrier in phase (Phase Locked Loop) and in frequency (Frequency Locked Loop), and more accurate measures on the phase delay are performed. The above-described algorithm, for correlating over relatively long time intervals a sampled GNS signal with a locally-generated signal, can be exploited both for the phase locking of the carrier, and for locking the delay of the code. In particular, the phase locking of the carrier relies upon measures of the phase of the carrier; the above-described algorithm is adapted to derive measures of the carrier phase, because the correlations are calculated for the I and Q components, and from these data the carrier phase can be derived. For locking the code delay, correlations of the sampled GNS signals with "early" and "late" local signals are calculated; the early and late signals are signals obtained by leading, respectively lagging, the locally-generated signal (the "prompt" signal); also these correlations can be obtained applying the above-described algorithm. Once the correlations for the "prompt", "early" and "late" signals are calculated, and the correlations for the I and Q components of the "prompt" signal are available, one of the closed-loop tracking modules known in the art can be implemented.

At each step with which the feedback on the carrier is performed, the correlations are to be calculated over the whole time interval, so as to take into account the new phase and frequency values obtained from the feedback. The previously calculated partial correlations $\text{Int}_n^{r,d}$ can be reused, applying the phase rotation due to the feedback. At each step, only the blocks 1, M−1 and M need to be re-calculated.

In order to apply the above-described algorithm to the tracking phase, the navigation message should be known in advance; this is not a problem, because almost all of the navigation message data repeat periodically for an interval of 2 hours. Only the bits related to the GPSTime change, but their value is simply increased at each repetition, and thus they are easily predictable.

In the tracking phase, after having calculated the partial correlations $\text{Int}_n^{r,d}$ (with n equal to 0, M−1 and M), the value of the navigation message data bit that, in the summation, multiplies the partial correlation $\text{Int}_n^{r,d}$ should be estimated. This can for example be done in one of the following two ways. In a first way, the synchronization is determined aligning the sequence that maximizes the correlation calculated at the previous step with the data bit stream received as a part of the assistance data; using this synchronization, the value of the navigation message data bit to be applied to the last partial correlation $\text{Int}_M^{r,d}$ is predicted. Alternatively, the calculation is carried out for one bit value compatible with the navigation message data bit stream, choosing the delay k where a maximum peak is detected, without implementing synchronization algorithms.

The Applicant has performed a series of comparative tests which have proved that the method according to the described embodiments of the present invention is suitable to acquire GPS signals in indoor environments.

FIG. 9 shows an exemplary configuration of GPS satellites assumed to be in view at a considered location; the numbers within the circles denotes the satellites.

To verify the capability of acquiring signals in indoor environments, a weak Pseudo Random Noise (PRN) signal has been chosen, for example corresponding to satellite number 14 in the figure, and the above-described signal acquisition method has been applied.

In order to verify the weakness of the signal transmitted by the satellite number 14, a Fast Fourier Transform (FFT)-based circular correlation together with non-coherent averaging of 400 coherent blocks (10 ms coherent integration time) has been used with the indoor signal, both in unassisted (i.e., missing the assistance data) and assisted modes.

In unassisted mode, the receiver has no a priori knowledge of the observed Doppler frequency shift, so that the receiver has to scan the whole nominal Doppler frequency range, from −5 kHz to +5 kHz.

In assisted mode (A-GPS), the Doppler frequency is fixed at the value estimated by a reference receiver. The following assumption have been made:
1. the receiver has been driven by an ultra-stable and ultra-accurate rubidium oscillator;
2. the reference receiver antenna is placed at an outdoor location not far from the test indoor location.

This means that the Doppler frequency predicted by the reference receiver can be used as a reliable indication of the true Doppler frequency observed by the test receiver (e.g., −2.935 kHz for the signal of the satellite number 14).

Figure 10A:
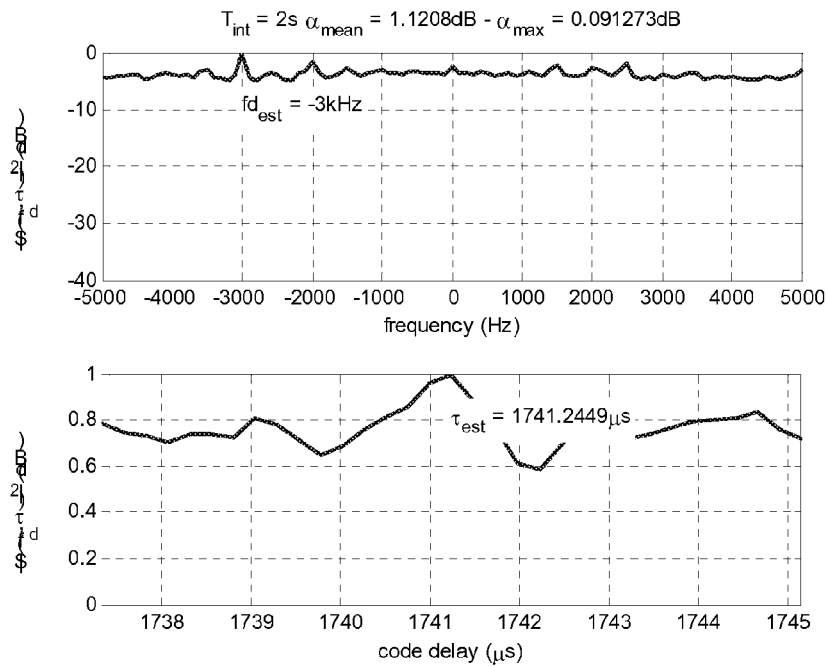
Figure 10B:
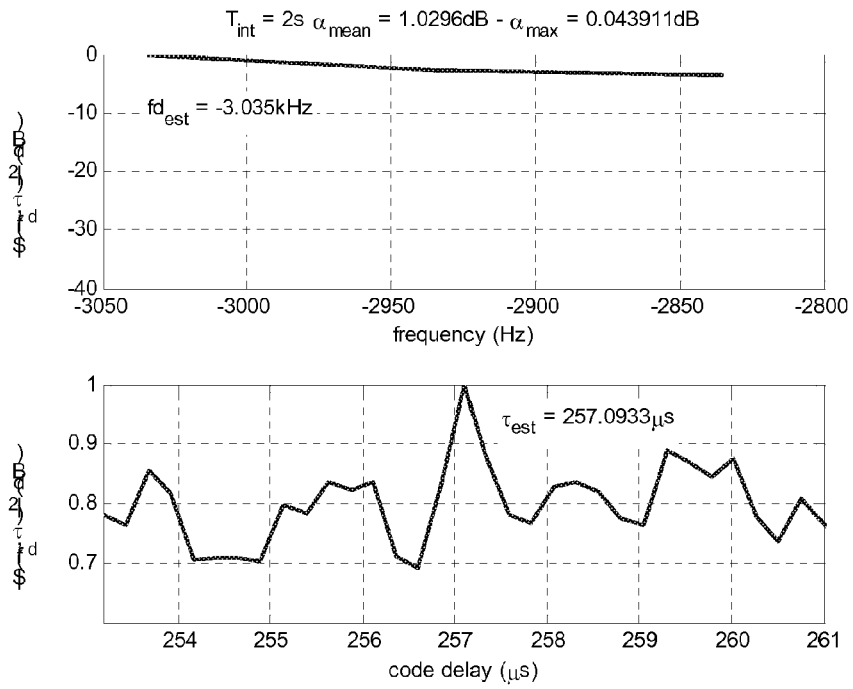

FIGS. 10A and 10B show, respectively for the unassisted and assisted case, the resulting Cross-Ambiguity Function (CAF) envelope (the CAF is the squared absolute value of the correlation integral) both in the frequency and the code-phase spaces. In particular, the frequency and codephase bins of the search-space maximum are depicted. In both the cases, the acquisition fails in estimating the true Doppler frequency value.

As a consequence, the codephase estimate is not reliable, since the separation between the main and secondary peaks is too small (less than 1 dB). In other words, the main peak and the noise-floor peaks are "statistically" indistinguishable. This is confirmed by the different Doppler and codephase estimates obtained in the two cases.

Figure 11A:
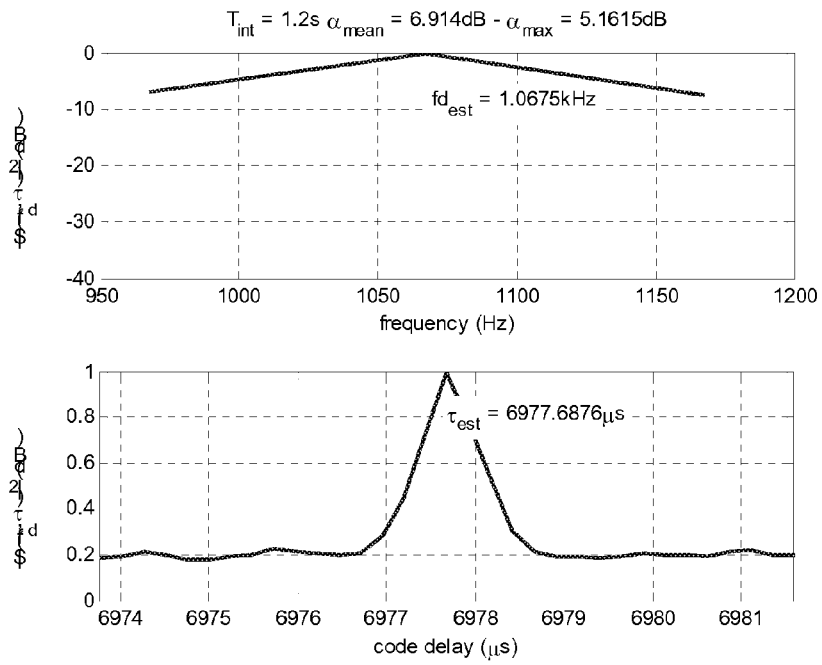
Figure 11B:
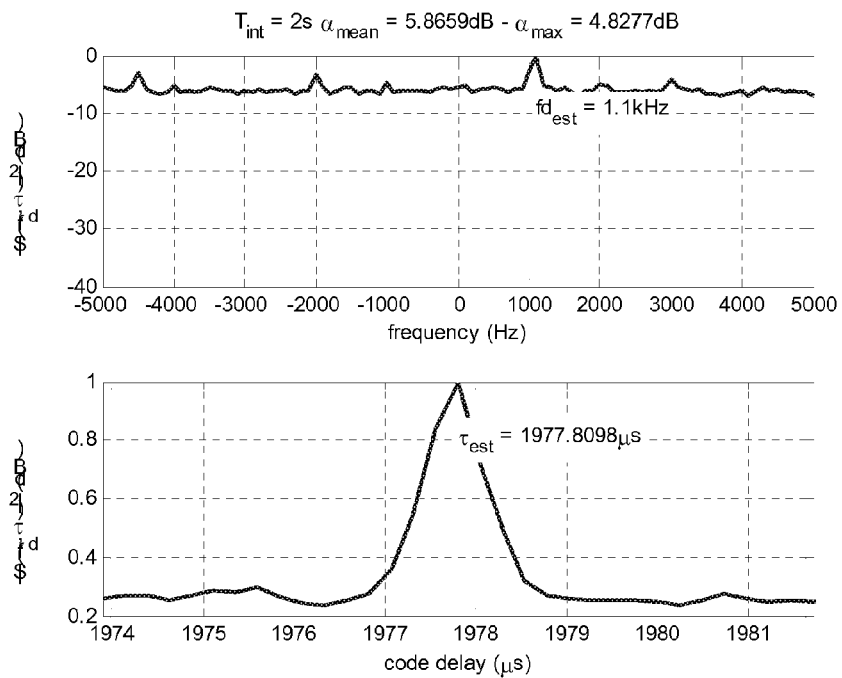

The same fast-correlation algorithm has been applied to the satellite number 6 in FIG. 9, assumed to be the strongest in the considered location, in assisted mode, with a predicted Doppler of 1.0675 kHz and 120 non-coherent averages. The obtained CAF is depicted in FIGS. 11A and 11B, respectively for the assisted and unassisted case. It can be noticed in the first case (FIG. 11A) that the true Doppler value can be exactly detected in assisted mode and in the second case (FIG. 11B) the estimated Doppler is however within the 100 Hz bin width used by the acquisition algorithm. In both the two cases, a "clean" autocorrelation peak has emerged from the noise floor. This indicates that the signal is a good candidate as "strongest satellite in view".

The overall signal acquisition process includes these steps:
1. FFT-based fast correlation and non-coherent averaging on the strongest satellite transmitter in view (e.g., satellite number 6) in unassisted mode;
2. Doppler frequency and codephase refining by means of a long coherent integration of 1.2 s, by means of the acquisition method according top the described invention embodiment;
3. From the refined estimates for the strongest PRN, computation of the predicted Doppler shift and codephase for the weak PRN to be acquired (in the considered example, satellite number 14);
4. Performing the high-sensitivity acquisition, by using the previously predicted Doppler shift and codephase as aiding information, with a suitably long coherent integration time (e.g. 2 s).

FIG. 12 depicts the search space resulting from application of step 1 above.

In step 2, the long coherent integration is performed, with the following assistance information:

$$f_{D,predicted} = 1.1 \text{ kHz}$$

$$CP_6^{(predicted)} = 977.8 \text{ μs} \approx 1000.3 \text{ chips}$$

The resulting CAF envelope is depicted in FIG. 13. The Doppler frequency estimate is now equal to the true value given by the assistance server. The codephase estimate is practically the same obtained at step 1.

At step 3, the assistance data for the acquisition of the weak signal of satellite number 14 are computed by resolving for the time and frequency offsets between the reference receiver and the test receiver. As stated before, such offsets affect all the codephase and Doppler shift values from the reference receiver, which in turns cannot be applied directly.

The following steps illustrate such a calculation:
a. Considering the code phase indication from the reference receiver for both satellite number 6 and satellite number 14:

$$CP_6^{(ref)} = 120 \text{ chips}$$

$$CP_{14}^{(ref)} = 108 \text{ chips}$$

b. after the acquisition on satellite number 6 the estimated codephase is:

$$CP_6^{(acq)} = 1000.3 \text{ chips}$$

c. the time offset between the reference receiver and the front-end (the subsystem that performs the sampling) can be then evaluated as:

$$\Delta CP = CP_6^{(acq)} - CP_6^{(ref)} = 880.3 \text{ chips}$$

d. since the recorded signal is the same there are no time drifts to take into account and the time offset affects all the codephases. Thus:

$$\Delta CP = CP_{14}^{(predict)} - CP_{14}^{(ref)}$$

The predicted code phase for satellite number 14 to be used in the high-sensitivity acquisition is therefore:

$$CP_{14}^{(predict)} = \Delta CP_{14}^{(ref)} = 880.3 + 108 = 988.3 \text{ chips}$$

e. the same approach should be followed to compute the predicted Doppler shift for satellite number 14:

$$\Delta f_D = f_{D,6}^{(acq)} - f_{D,6}^{(ref)} = (1.0683 - 1.0675) \text{ kHz} = 0.8 \text{ Hz}$$

Then, in can be directly assumed that:

$$f_{D,14}^{(predict)} = \Delta f_D + f_{D,14}^{(ref)} = -2.9358 \text{ kHz}$$

Figure 14A:
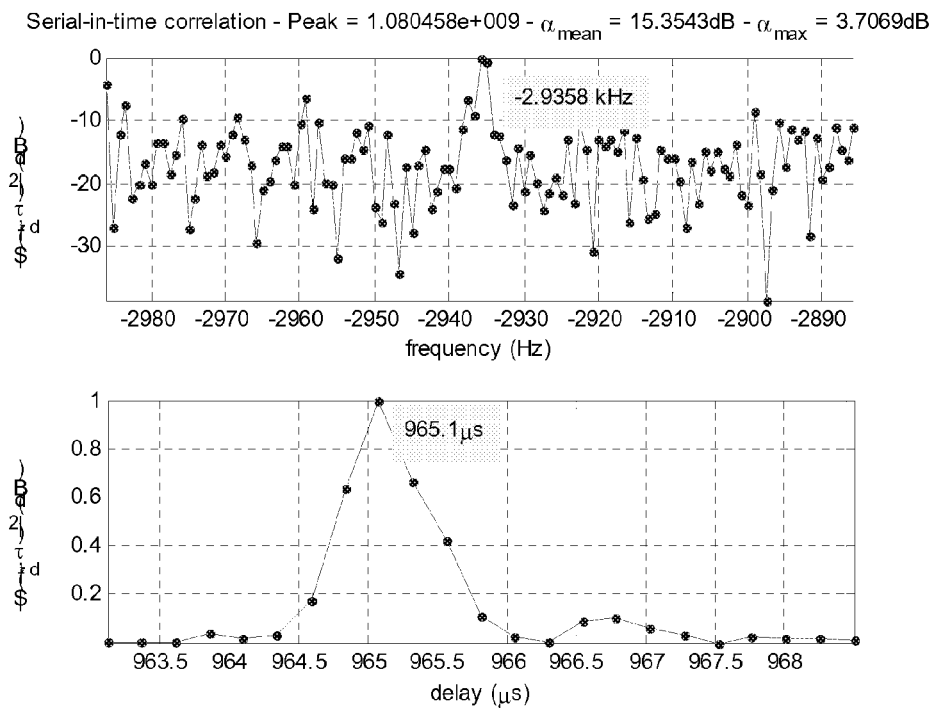
Figure 14B:
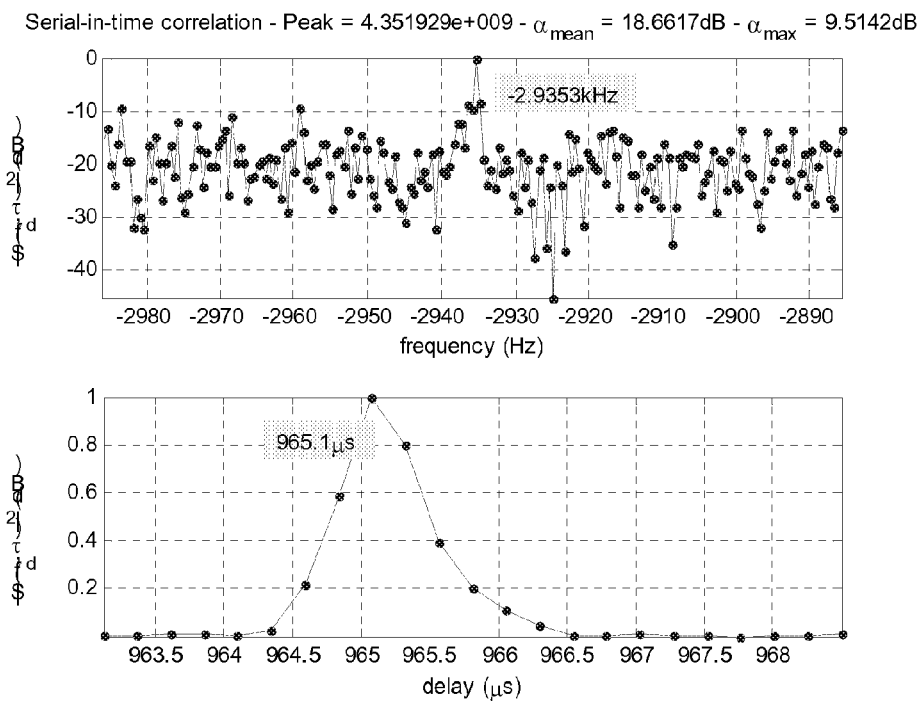

At step 4, the long coherent correlation algorithm is finally applied to satellite number 14, using the previously predicted Doppler shift and codephase. The resulting CAF envelope is depicted in FIGS. 14A and 14B, respectively for 1.2 s and 2.0 s of (coherent) integration time. The estimated values are summarized in the table below.

| Coherent Integration Time | Frequency bins | Doppler shift | | Code phase | |
|---|---|---|---|---|---|
| | | Predicted | Estimated | Predicted | Estimated |
| 1.2 s | 121 | −2.9358 kHz | −2.9358 kHz | 988.3 chips | 987.3 chips (965.1 μs) |
| 2.0 s | 201 | | −2.9353 kHz | | 987.3 chips (965.1 μs) |

The estimated Doppler shift differs at most in 0.5 Hz from the predicted value. This means that the Doppler estimation accuracy has achieved its optimal level since step 3. Therefore, the scanned frequency range could have been few Hz wide, rather than the 100 Hz used in the present test, with an improved computational complexity.

The method according to the herein described embodiments of the present invention is particularly useful in situations where the terrestrial radio communication network through which the receives gets the assistance data is not synchronous with the GPS satellite transmitters.

It is observed that when the receiver has acquired a signal, the receiver clock can be synchronized with the GPSTime; however, since the normal clock drift of commercial receivers is such that synchronization with the GPSTime is not maintained for very long times, in order to keep the receiver clock synchronized with the GPSTime it might be necessary to periodically perform receiver localizations, even if not strictly requested by the user; this is however disadvantageous, especially when the receiver is indoor, because of the battery power consumption and the increase in data traffic over the terrestrial radio communication network for requesting and receiving the assistance data. The proposed method allows avoiding the need of performing such periodic localizations.

The method according to an embodiment of the present invention may also be exploited in scenarios where the offset and drift information about the clock of the receiver are not available; based on the code-phase and Doppler shift available for a first satellite transmitter, the code-phase and Doppler shift of the clock are calculated, exploiting the information about the reference position and trajectory of the satellites.

The method according to the present invention is applicable in general to any GNSS receiver, in particular to a GPS or modernized GPS (evolution of the GPS) receivers, Galileo and Glonass. For example, in the Galileo system, the method of the invention can be exploited for the acquisition and tracking of either the signal carrying the navigation message (L1B channel) or the pilot channel carrying the secondary code (L1C channel) or for both the channels, jointly, with a sensitivity increase of 3 dB compared to a single channel. To exploit the power transmitted on the L1B and L1C channels, for each phase value, the code of the snapshot is subdivided in blocks of about 1 ms, as described above, and the I and Q correlation values for the generic block are calculated for the L1B and L1C channels, using the two different codes. The partial correlations calculated for the individual blocks are then added up, keeping distinct the I and Q components, considering the phase transitions of the navigation message and of the secondary code. The correlation is thus calculated including in a same summation the partial correlations on both the L1B channel, and on the L1C channel.

The invention claimed is:

1. A method of acquisition of a received signal received from a global navigation satellite system, comprising:

obtaining a snapshot of the received signal; and
correlating the snapshot with a locally-generated signal,
wherein said correlating comprises:
trying at least one phase delay value indicative of a hypothesized phase delay of the locally-generated signal with respect to the snapshot;
obtaining a partition of the snapshot and the locally-generated signal into corresponding pluralities of blocks; and
calculating partial correlation integrals for each block of said plurality of blocks,
said corresponding pluralities of blocks each comprising a first block having a time duration related to a phase delay value.

2. The method of claim 1, wherein the corresponding pluralities of blocks each comprise a plurality of second blocks having a predetermined time duration and a final block having a time duration determined by a difference between the time duration of one of the second blocks and the time duration of the first block.

3. The method of claim 1, wherein said correlating comprises obtaining cumulated correlation integrals by summing up partial correlation integrals calculated for each block of said corresponding plurality of blocks.

4. The method of claim 3, wherein said summing up comprises adjusting a sign of the partial correlation integrals based on at least one hypothesized time sequence of binary data of a navigation message modulating in phase the received signal, and said correlating is performed individually for in-phase and in-quadrature components of the snapshot and the locally-generated signals.

5. The method of claim 4, wherein said correlating comprises obtaining an indication of a correlation integral between the locally-generated signal and the snapshot by adding up square absolute values of the cumulated correlation integrals for the in-phase and in-quadrature components.

6. The method of claim 5, comprising repeating said summing up for at least two hypothesized time sequences of binary data of the navigation message.

7. The method of claim 6, comprising:
repeating said obtaining a partitioning of the snapshot and the locally-generated signal into corresponding pluralities of blocks and calculating partial correlation integrals for each block of said plurality of blocks for at least two phase delay values indicative of two hypothesized phase delays of the locally-generated signal with respect to the snapshot.

8. The method of claim 7, wherein said correlating the snapshot with a locally-generated signal comprises correlating the snapshot with at least two locally-generated signals, each locally generated signal having a tentative frequency related to a nominal frequency of the received signal corrected by a respective frequency correction factor, the time duration of the blocks of said pluralities being related to said tentative frequency.

9. The method of claim 8, wherein said frequency correction factor is related to a Doppler shift value hypothesizing a Doppler shift experienced by the nominal frequency due to a relative motion between a transmitter of the received signal and a receiver of the received signal.

10. The method of claim 9, further comprising identifying a maximum between indications of correlation integrals calculated for at least two hypothesized time sequences of binary data, the at least two hypothesized phase delay values and the at least two tentative frequencies.

11. The method of claim 10, further comprising deriving, from the hypothesized time sequences of binary data of the navigation message that provides said maximum, information about GPSTime of a satellite transmitter.

12. The method of claim 11, further comprising estimating a time of reception of the signal based on estimated GPSTime of the transmitter, corrected taking into account a signal propagation delay from the satellite transmitter to the receiver.

13. A global navigation satellite system receiver comprising functional modules capable of being configured for:
obtaining a snapshot of a received signal; and
correlating the snapshot with a locally-generated signal, wherein said correlating comprises:
trying at least one phase delay value indicative of an hypothesized phase delay of the locally-generated signal with respect to the snapshot;
obtaining a partition of the snapshot and the locally-generated signal into corresponding pluralities of blocks each comprising a first block having a time duration related to a phase delay value; and
calculating partial correlation integrals for each block of said plurality of blocks.

14. The global navigation satellite system receiver of claim 13, wherein the corresponding pluralities of blocks each comprises a plurality of second blocks having a predetermined time duration, and a final block having a time duration determined by a difference between the time duration of one of the second blocks and the time duration of the first block.

15. The global navigation satellite system receiver of claim 13, wherein said functional modules capable of being configured for correlating, comprise functional modules capable of being configured for obtaining cumulated correlation integrals by summing up the partial correlation integrals calculated for each block of said corresponding plurality of blocks.

16. The global navigation satellite system receiver of claim 15, wherein said functional modules capable of being configured for summing up, comprise functional modules capable of being configured for adjusting a sign of the partial correlation integrals based on at least one hypothesized time sequence of binary data of a navigation message modulating in phase the received signal.

17. The global navigation satellite system receiver of claim 16, wherein said functional modules capable of being configured for correlating are capable of being configured for performing said correlating individually for in-phase and in-quadrature components of the snapshot and the locally-generated signals, said functional modules capable of being configured for correlating, comprising functional modules capable of being configured for obtaining an indication of a correlation integral between the locally-generated signal and the snapshot by adding up square absolute values of the cumulated correlation integrals for the in-phase and in-quadrature components.

18. The global navigation satellite system receiver of claim 17, wherein said functional modules are capable of being configured for repeating said summing up for at least two hypothesized time sequences of binary data of the navigation message.

19. The global navigation satellite system receiver of claim 18, wherein said functional modules are capable of being configured for repeating said obtaining a partitioning of the snapshot and the locally-generated signal into corresponding pluralities of blocks and calculating partial correlation integrals for each block of said plurality of blocks for at least two phase delay values indicative of two hypothesized phase delays of the locally-generated signal with respect to the snapshot.

20. The global navigation satellite system receiver of claim 19, wherein said functional modules capable of being configured for correlating the snapshot with a locally-generated signal comprises functional modules capable of being configured for correlating the snapshot with at least two locally-generated signals, each locally generated signal having a tentative frequency related to a nominal frequency of the received signal corrected by a respective frequency correction factor, the time duration of the blocks of said pluralities being related to said tentative frequency.

21. The global navigation satellite system receiver of claim 20, wherein said frequency correction factor is related to a Doppler shift value hypothesizing a Doppler shift experienced by the nominal frequency due to a relative motion between a transmitter of the received signal and a receiver of the received signal.

22. The global navigation satellite system receiver of claim 20, further comprising functional modules capable of being configured for identifying a maximum between indications of correlation integrals calculated for at least two hypothesized time sequences of binary data, the at least two hypothesized phase delay values and the at least two tentative frequencies.

23. The global navigation satellite system receiver of claim 22, further comprising functional modules capable of being configured for deriving, from the hypothesized time sequences of binary data of the navigation message that provides said maximum, information about GPSTime of a satellite transmitter.

24. The global navigation satellite system receiver of claim 23, further comprising functional modules capable of being configured for estimating a time of reception of the signal based on the estimated GPSTime of the transmitter, corrected taking into account a signal propagation delay from the satellite transmitter to the receiver.

* * * * *